United States Patent
Kamata et al.

(10) Patent No.: US 7,577,141 B2
(45) Date of Patent: Aug. 18, 2009

(54) COMMUNICATION SYSTEM

(75) Inventors: Masanori Kamata, Yokohama (JP);
Hiroaki Miyata, Yokohama (JP);
Masayuki Hino, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 497 days.

(21) Appl. No.: 11/527,521

(22) Filed: Sep. 27, 2006

(65) Prior Publication Data
US 2007/0171930 A1    Jul. 26, 2007

(30) Foreign Application Priority Data
Jan. 20, 2006    (JP) ............................. 2006-011872

(51) Int. Cl.
*H04L 12/28* (2006.01)
*H04L 12/40* (2006.01)
(52) U.S. Cl. ....................... 370/390; 370/400
(58) Field of Classification Search .................. None
See application file for complete search history.

(56) References Cited
U.S. PATENT DOCUMENTS
7,315,543 B2 * 1/2008 Takeuchi et al. ............ 370/392
7,328,281 B2 * 2/2008 Takeda et al. ............... 709/246
7,400,646 B2 * 7/2008 Tsuchiya et al. ............. 370/466
2005/0175020 A1 * 8/2005 Park et al. .................... 370/400

FOREIGN PATENT DOCUMENTS
JP    2001-285357    10/2001

OTHER PUBLICATIONS
RFC2236, W. Fenner, et al, Xerox PARC, Nov. 1997.
RFC2710, S. Deering, et al, Cisco Systems, Oct. 1999.
RFC3376, B. Cain, et al, Cereva Networks, et al., Oct. 2002.
RFC3810, R. Vida, et al, LIP6, Jun. 2004.

* cited by examiner

*Primary Examiner*—Wing F Chan
*Assistant Examiner*—Eunsook Choi
(74) *Attorney, Agent, or Firm*—Brundidge & Stanger, P.C.

(57) ABSTRACT

An IPv4-IPv6 multicast address translation table is dynamically created, so that it is unnecessary to register multicast servers in advance. When an IPv4 MC group address exists as a response of a DNS server to a DNS request of an IPv6 MC client or when an IPv6 MC group address exists as a response of the DNS server to a DNS request of the IPv4 MC client H1 to H4, DNS Proxy D3 requests an MC adaptive translator T1 to generate a virtual IPv6 MC group address or a virtual IPv4 MC group address, and the MC adaptive translator T1 generates a virtual IPv6 MC group address or a virtual IPv4 MC group address from an address pool, and also creates an MC address translation table, whereby the MC address translation of IPv4-IPv6 can be dynamically performed.

16 Claims, 24 Drawing Sheets

| 20151 | 20152 | 20153 | 20154 |
|---|---|---|---|
| MULTICAST GROUP ADDRESS | MULTICAST SERVER ADDRESS | VIRTUAL MULTICAST GROUP ADDRESS | VIRTUAL MULTICAST SERVER ADDRESS |
| f001::1 | 2001::1 | | |
| f001::1 | 2001::2 | | |
| ⋮ | ⋮ | ⋮ | ⋮ |

FIG.3A

| MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|
| f001::1 | 2001::1 | 238.0.0.1 | 192.0.1.1 |
| f001::1 | 2001::2 | 238.0.0.1 | 192.0.1.2 |
| ⋮ | ⋮ | ⋮ | ⋮ |

FIG.3B

| MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|
| f001::1 | 2001::1 | 238.0.0.1 | 192.0.1.1 |
| f001::1 | 2001::2 | 238.0.0.1 | 192.0.1.2 |
| f040::1 | - | | |
| ⋮ | ⋮ | ⋮ | ⋮ |

FIG.3C

| MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|
| f001::1 | 2001::1 | 238.0.0.1 | 192.0.1.1 |
| f001::1 | 2001::2 | 238.0.0.1 | 192.0.1.2 |
| f040::1 | 3001::1 | | |
| ⋮ | ⋮ | ⋮ | ⋮ |

FIG.3D

| MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|
| f001::1 | 2001::1 | 238.0.0.1 | 192.0.1.1 |
| f001::1 | 2001::2 | 238.0.0.1 | 192.0.1.2 |
| f040::1 | 3001::1 | 238.0.1.2 | 192.0.2.3 |
| ⋮ | ⋮ | ⋮ | ⋮ |

FIG.3E

| MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|
| f001::1 | 2001::1 | 238.0.0.1 | 192.0.1.1 |
| f001::1 | 2001::2 | 238.0.0.1 | 192.0.1.2 |
| f040::1 | 3001::1 | 238.0.1.2 | 192.0.2.3 |
| f036::2 | – | | |
| ⋮ | ⋮ | ⋮ | ⋮ |

FIG.3F

| MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|
| f001::1 | 2001::1 | 238.0.0.1 | 192.0.1.1 |
| f001::1 | 2001::2 | 238.0.0.1 | 192.0.1.2 |
| f040::1 | 3001::1 | 238.0.1.2 | 192.0.2.3 |
| f036::2 | – | 238.0.3.3 | – |
| ⋮ | ⋮ | ⋮ | ⋮ |

FIG.3G

| | 60001 | 60002 | 60003 | 60004 | 60005 |
|---|---|---|---|---|---|
| | DOMAIN | MULTICAST GROUP ADDRESS | MULTICAST SERVER ADDRESS | VIRTUAL MULTICAST GROUP ADDRESS | VIRTUAL MULTICAST SERVER ADDRESS |
| | aaa.com | f001::1 | 2001::1 | | |
| | aaa.com | f001::1 | 2001::2 | | |
| | · | · | · | · | · |
| | · | · | · | · | · |
| | · | · | · | · | · |

FIG.4A

| DOMAIN | MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|---|
| aaa.com | f001::1 | 2001::1 | 238.0.0.1 | 192.0.1.1 |
| aaa.com | f001::1 | 2001::2 | 238.0.0.1 | 192.0.1.2 |
| · | · | · | · | · |
| · | · | · | · | · |
| · | · | · | · | · |

FIG.4B

| DOMAIN | MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|---|
| aaa.com | f001::1 | 2001::1 | 238.0.0.1 | 192.0.1.1 |
| aaa.com | f001::1 | 2001::2 | 238.0.0.1 | 192.0.1.2 |
| bbb.com | f040::1 | - | | |
| . | . | . | . | . |
| . | . | . | . | . |
| . | . | . | . | . |

FIG.4C

| DOMAIN | MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|---|
| aaa.com | f001::1 | 2001::1 | 238.0.0.1 | 192.0.1.1 |
| aaa.com | f001::1 | 2001::2 | 238.0.0.1 | 192.0.1.2 |
| bbb.com | f040::1 | 3001::1 | 238.0.1.2 | 192.0.2.3 |
| . | . | . | . | . |
| . | . | . | . | . |
| . | . | . | . | . |

FIG.4D

| DOMAIN | MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|---|
| aaa.com | f001::1 | 2001::1 | 238.0.0.1 | 192.0.1.1 |
| aaa.com | f001::1 | 2001::2 | 238.0.0.1 | 192.0.1.2 |
| bbb.com | f040::1 | 3001::1 | 238.0.1.2 | 192.0.2.3 |
| ccc.com | f036::2 | - | | |
| . | . | . | . | . |
| . | . | . | . | . |
| . | . | . | . | . |

FIG.4E

| DOMAIN | MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|---|
| aaa.com | f001::1 | 2001::1 | 238.0.0.1 | 192.0.1.1 |
| aaa.com | f001::1 | 2001::2 | 238.0.0.1 | 192.0.1.2 |
| bbb.com | f040::1 | 3001::1 | 238.0.1.2 | 192.0.2.3 |
| ccc.com | f036::2 | - | 238.0.3.3 | - |
| . | . | . | . | . |
| . | . | . | . | . |
| . | . | . | . | . |

FIG.4F

| MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|
| 237. 0. 0. 1 | 192. 1. 2. 1 | | |
| . | . | . | . |
| . | . | . | . |
| . | . | . | . |

FIG.17A

| MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|
| 237. 0. 0. 1 | 192. 1. 2. 1 | f020::1 | 2050::5 |
| . | . | . | . |
| . | . | . | . |
| . | . | . | . |

FIG.17B

| | 61001 | 61002 | 61003 | 61004 | 61005 |
|---|---|---|---|---|---|
| | DOMAIN | MULTICAST GROUP ADDRESS | MULTICAST SERVER ADDRESS | VIRTUAL MULTICAST GROUP ADDRESS | VIRTUAL MULTICAST SERVER ADDRESS |
| | ddd.com | 237.0.0.1 | 192.1.2.1 | | |
| | . | . | . | . | . |
| | . | . | . | . | . |
| | . | . | . | . | . |

FIG.18A

| DOMAIN | MULTICAST GROUP ADDRESS | MULTICAST SERVER ADDRESS | VIRTUAL MULTICAST GROUP ADDRESS | VIRTUAL MULTICAST SERVER ADDRESS |
|---|---|---|---|---|
| ddd.com | 237.0.0.1 | 192.1.2.1 | f020::1 | 2050::5 |
| . | . | . | . | . |
| . | . | . | . | . |
| . | . | . | . | . |

FIG.18B

| DOMAIN 90001 | MULTICAST GROUP ADDRESS 90002 | MULTICAST SERVER ADDRESS 90003 |
|---|---|---|
| ddd.com | 237.0.0.1 | 192.1.2.1 |
| ⋮ | ⋮ | ⋮ |

FIG.19

| MULTICAST GROUP ADDRESS 81001 | MULTICAST SERVER ADDRESS 81002 |
|---|---|
| 237.0.0.1 | 192.1.2.1 |
| ⋮ | ⋮ |

FIG.20

COMMUNICATION SYSTEM

BACKGROUND OF THE INVENTION

The present invention relates to a communication system for multicast distribution, and more particularly to a communication system that is equipped with a multicast adaptive translator device and performs multicast address translation of IPv4-IPv6.

A content distribution service using multicast in the Ipv4 network has been recently founded. Furthermore, a network based on the IPv6 network has been also expanded because of a so-called address depletion problem, etc. When the same service as the content distribution service provided in the IPv4 network is provided in the IPv6 network, it is necessary to provide the same multicast server to the IPv6 network. At this time, it is expected that the multicast server is not provided to each of the IPv4 network and the IPv6 network, but a multicast server which overstrides both the IPv4 and IPv6 is developed.

Therefore, when a client in the IPv6 network views/listens to a content of a multicast server of the IPv4 network or a client in the IPv4 network views/listens to a content of a multicast server of the IPv6 network, it is necessary to perform multicast packet translation in a multicast adaptive translator as in the case of an unicast packet.

JP-A-2001-285357 has proposed a system of statically pre-registering IPv4-IPv6 multicast group addresses in an address translation table of the translator. According to this system, the multicast communication is carried out by carrying out multicast address translation with a pre-registered multicast server. That is, according to this publication, an IPv6 multicast packet from a multicast server connected to the IPv6 network is translated into a pre-registered virtual IPv4 multicast group address, and then the multicast packet is transmitted to a multicast client connected to the IPv4 network.

Furthermore, there have been also proposed protocols such as Internet Group Management Protocol (IGMPv3) and Multicast Listener Discovery (MLDv2) in which a multicast client can indicate plural multicast server addresses (source addresses) for one multicast group address as disclosed in RFC2236 (IGMPv2), RFC2710 (MLDv1), RFC3376 (IGMPv3) and RFC3810 (MLDv2).

SUMMARY OF THE INVENTION

For example, in JP-A-2001-285357, it is necessary to statically pre-register multicast group addresses, and thus when a request packet is transmitted from a multicast client before the registration, no multicast communication may be carried out because it has not registered in the multicast address translation table. Furthermore, there has not been hitherto any means of determining a multicast server address from a multicast group address, and thus there is a case where the multicast communication using the IGMPv3 and the MLDv2 in which plural multicast server addresses are indicated for one multicast group address. Furthermore, with respect to multicast servers, there is a case where the number of multicast servers being used is varied because of load sharing in accordance with the type of a service (program, time zone, etc.), so that it is required to manage the multicast server addresses while flexibly adapting to the increase/decrease of the number of multicast servers being used.

The present invention has been implemented in view of the foregoing problem, and has an object to make it unnecessary to pre-register multicast servers by dynamically creating an IPv4-IPv6 multicast address translation table.

Furthermore, the present invention has another object to enable a multicast service using IGMPv3-MLDv2 by dynamically creating a multicast address translation table in which IPv4-IPv6 multicast server addresses are registered.

According to this invention, for example, the IPV4 network and the IPv6 network are provided with a DNS server and a DNS Proxy for notifying a multicast group address and a multicast server address in response to a DNS (Domain Name System) request from a multicast client, and there is provided with a multicast adaptive translator for mutually connecting the IPv4 network and the IPv6 network to each other and carry out IPv4-IPv6 multicast packet translation.

When an IPv4 multicast group address exists in a response transmitted from the DNS server to the DNS request from the IPv6 multicast client, or when an IPv4 multicast group address exists in a response transmitted from the DNS server to the DNS request from the IPv4 multicast client, DNS Proxy requests the multicast adaptive translator to generate a virtual IPv6 multicast group address or a virtual IPv4 multicast group address. The multicast adaptive translator generates the virtual IPv6 multicast group address or the virtual IPv4 multicast group address from an address pool, and also creates a multicast address translation table, whereby the dynamic multicast address translation of IPv4-IPv6 can be performed.

Furthermore, the multicast group address and the multicast server address are managed, and a virtual IPv6 multicast server address or a virtual IPv4 multicast server address is generated in the multicast adaptive translator on the basis of a DNS request from the multicast client as a trigger, whereby translation of multicast server address in payloads of IGMPv3 and MLDv2 can be performed.

When the management of the multicast group address and the multicast server address is carried out by the DNS server, it may be considered as being difficult to change the DNS address managing table in accordance with the increase/decrease of the number of multicast servers being used which is caused by the type of services (program, time zone, etc.). Therefore, the increase/decrease of the multicast server can be performed in accordance with the traffic by providing a multicast server address managing server for a multicast group address and a multicast server address to the external.

According to the first aspect of the present invention, there is provided a communication system comprising:

an IPv4 network for transferring packets according to an IPv4 multicast(MC) address;

an IPv6 network for transferring packets according to an IPv6 MC address;

an MC adaptive translator T1 having an IPv6 MC address translation table in which MC group address and MC server address of IPv6 and virtual MC group address and virtual MC server address of IPv4 are stored in association with one another, the translator T1 mutually connecting the IPv4 network and the IPv6 network and carrying out IPv4-IPv6 MC packet conversion;

an IPv4 DNS server D1 that is connected to the IPv4 network and responds to a Domain Name System (DNS) request from an IPv4 MC client;

a DNS proxy D3 that is connected to the IPv6 network and has an IPv6 MC address managing table for storing a domain, an MC group address, an MC server address, a virtual MC group address and a virtual MC server address in association with one another; and an IPv6 network DNS server D2 that is connected to the IPv6 network and has an MC address managing table for storing a domain, an MC group address and an MC server address in association with one another, wherein the MC client of the IPv4 network transmits a DNS request 1 as an MC address notifying request to the IPv4 DNS server D1 by using as a key a domain of an MC server of the IPv6 network whose content is viewed/listened to;

the IPv4 DNS server D1 transmits a DNS request 2 of the domain concerned while a virtual IPv4 unicast address of a DNS proxy D3 existing in the IPv6 network is set as a destination address;

the DNS proxy D3 transmits a DNS request 3 of the domain concerned to the IPv6 DNS server D2;

the IPv6 DNS server D2 searches the MC address managing table and returns the MC group address and the MC server address of the MC server of the domain to the DNS proxy D3;

the DNS proxy D3 registers the received MC group address and MC server address into the IPv6 MC address managing table, and transmits a request for generating the virtual MC group address and virtual MC server address corresponding to both the addresses concerned to the translator T1;

the translator T1 generates the virtual MC group address and the virtual MC server address of IPv4 corresponding to the received MC group address and MC server address respectively, registers the virtual MC group address and the virtual MC server address into the IPv6 MC address translation table and transmits the virtual MC group address and the virtual MC server address to the DNS proxy D3;

the DNS proxy D3 registers the received virtual MC group address and virtual MC server address into the IPv6 MC address managing table and transmits the virtual MC group address and the virtual MC server address to the IPv4 DNS server D1; and the IPv4 DNS server D1 transmits the virtual MC group address and virtual MC server address of the MC server of the domain to the MC client of the IPv4 network NW1.

According to the second aspect of the present invention, there is provided a communication system comprising:

an IPv4 network for transferring packets according to an IPv4 multicast (MC) address;

an IPv6 network for transferring packets according to an IPv6 MC address;

an MC adaptive translator T1 having an IPv6 MC address translation table in which MC group address and MC server address of IPv6 and virtual MC group address and virtual MC server address of IPv4 are stored in association with one another, the translator T1 mutually connecting the IPv4 network and the IPv6 network and carrying out IPv4-IPv6 MC packet conversion;

an IPv4 DNS server D1 that is connected to the IPv4 network and responds to a Domain Name System (DNS) request from an IPv4 MC client;

a DNS proxy D3 that is connected to the IPv6 network and has an IPv6 MC address managing table for storing a domain, an MC group address, an MC server address, a virtual MC group address and a virtual MC server address in association with one another;

an IPv6 network DNS server D2 that is connected to the IPv6 network and has an MC address managing table for storing a domain, an MC group address and an MC server address in association with one another; and an MC server address managing server MA1 having an IPv6 MC address managing table for managing the MC group address and the MC server address, wherein the MC client of the IPv4 network transmits a DNS request 1 as an MC address notifying request to the IPv4 DNS server D1 by using as a key a domain of an MC server of the IPv6 network whose content is viewed/listened to;

the IPv4 DNS server D1 transmits a DNS request 2 of the domain concerned while a virtual IPv4 unicast address of a DNS proxy D3 existing in the IPv6 network is set as a destination address;

the DNS proxy D3 transmits a DNS request 3 of the domain concerned to the IPv6 DNS server D2;

the IPv6 DNS server D2 searches the MC address managing table, and returns only the MC group address of the MC server of the domain when the MC server address of the MC server of the domain is not held;

the DNS proxy D3 registers the received MC group address into the IPv6 MC address managing table and transmits a request for generating the virtual MC group address corresponding to the MC group address to the translator T1;

the translator T1 registers the received MC group address into the IPv6 MC address translation table, searches the IPv6 MC address translation table and transmits a request for notifying the MC server address to the MC server address managing server MA1 by using the MC group address as a key when the MC server address corresponding to the MC group address is not held;

the MC server address managing server MA1 searches the MC server address corresponding to the MC group address and transmits the MC server address to the translator T1;

the translator T1 generates the IPv4 virtual MC server address corresponding to the received MC server address and the IPv4 virtual MC group address corresponding to the MC group address, registers the IPv4 virtual MC server address and the IPv4 virtual MC group address into the IPv6 MC address translation table and then returns the IPv4 virtual MC server address and the virtual MC group address to the DNS proxy D3;

The DNS proxy D3 registers the received virtual MC group address and virtual MC server address into the IPv6 MC address managing table, and transmits the virtual MC group address and the virtual MC server address to the IPv4 DNS server D1; and the IPv4 DNS server D1 transmits the virtual MC group address and the virtual MC server address of the MC server of the domain to the MC client of the IPv4 network NW1.

According to the third aspect of the present invention, there is provided a communication system comprising:

an IPv4 network for transferring packets according to an IPv4 multicast (MC) address;

an IPv6 network for transferring packets according to an IPv6 MC address;

an MC adaptive translator T1 having an IPv6 MC address translation table in which MC group address and MC server address of IPv6 and virtual MC group address and virtual MC server address of IPv4 are stored in association with one another, the translator T1 mutually connecting the IPv4 network and the IPv6 network and carrying out IPv4-IPv6 MC packet conversion;

an IPv4 DNS server D1 that is connected to the IPv4 network and responds to a Domain Name System (DNS) request from an IPv4 MC client;

a DNS proxy D3 that is connected to the IPv6 network and has an IPv6 MC address managing table for storing a domain, an MC group address, an MC server address, a virtual MC group address and a virtual MC server address in association with one another;

an IPv6 network DNS server D2 that is connected to the IPv6 network and has an MC address managing table for storing a domain, an MC group address and an MC server address in association with one another; and an MC server address managing server MA1 having an IPv6 MC address managing table for managing the MC group address and the MC server address, wherein the MC client of the IPv4 network transmits a DNS request 1 as an MC address notifying request to the IPv4 DNS server D1 by using as a key a domain of an MC server of the IPv6 network whose content is viewed/listened to;

the IPv4 DNS server D1 transmits a DNS request 2 of the domain concerned while a virtual IPv4 unicast address of a DNS proxy D3 existing in the IPv6 network is set as a destination address;

the DNS proxy D3 transmits a DNS request 3 of the domain concerned to the IPv6 DNS server D2;

the IPv6 DNS server D2 searches the MC address managing table, and returns only the MC group address of the MC server of the domain when the MC server address of the MC server of the domain is not held;

the DNS proxy D3 registers the received MC group address into the IPv6 MC address managing table and transmits a request for generating the virtual MC group address corresponding to the MC group address to the translator T1;

the translator T1 generates the virtual MC group address and virtual MC server address corresponding to the MC group address and MC server address respectively, registers the virtual MC group address and the virtual MC server address into the IPv6 MC address translation table and returns the virtual MC group address and the virtual MC server address to the DNS proxy D3, when a table of the MC group address and the MC server address of the MC server of the domain has been already held in the IPv6 MC address translation table at the previous DNS request time of the MC client;

the DNS proxy D3 registers the received virtual MC group address and virtual MC server address into the IPv6 MC address managing table and transmits the virtual MC group address and the virtual MC server address to the IPv4 DNS server D1; and the IPv4 DNS server D1 transmits the virtual MC group address and the virtual MC server address of the MC server of the domain to the MC client of the IPv4 network NW1.

According to the forth aspect of the present invention, there is provided a communication system comprising:

an IPv4 network for transferring packets according to an IPv4 multicast (MC) address;

an IPv6 network for transferring packets according to an IPv6 MC address;

an MC adaptive translator T1 having an IPv6 MC address translation table in which MC group address and MC server address of IPv6 and virtual MC group address and virtual MC server address of IPv4 are stored in association with one another, the translator T1 mutually connecting the IPv4 network and the IPv6 network and carrying out IPv4-IPv6 MC packet conversion;

an IPv4 DNS server D1 that is connected to the IPv4 network and responds to a Domain Name System (DNS) request from an IPv4 MC client;

a DNS proxy D3 that is connected to the IPv6 network and has an IPv6 MC address managing table for storing a domain, an MC group address, an MC server address, a virtual MC group address and a virtual MC server address in association with one another;

an IPv6 network DNS server D2 that is connected to the IPv6 network and has an MC address managing table for storing a domain, an MC group address and an MC server address in association with one another; and an MC server address managing server MA1 having an IPv6 MC address managing table for managing the MC group address and the MC server address, wherein the MC client of the IPv4 network transmits a DNS request 1 as an MC address notifying request to the IPv4 DNS server D1 by using as a key a domain of an MC server of the IPv6 network whose content is viewed/listened to;

the IPv4 DNS server D1 transmits a DNS request 2 of the domain concerned while a virtual IPv4 unicast address of a DNS proxy D3 existing in the IPv6 network is set as a destination address;

the DNS proxy D3 transmits a DNS request 3 of the domain concerned to the IPv6 DNS server D2;

the IPv6 DNS server D2 searches the MC address managing table, and returns only the MC group address of the MC server of the domain when the MC server address of the MC server of the domain is not held;

the DNS proxy D3 registers the received MC group address into the IPv6 MC address managing table and transmits a request for generating the virtual MC group address corresponding to the MC group address to the translator T1;

the translator T1 registers the received MC group address into the IPv6 MC address translation table, and searches the IPv6 MC address translation table, and transmits a request for notifying the MC server address to the MC server address managing server MA1 by using the MC group address as a key when the MC server address corresponding to the MC group address is not held;

the MC server address managing server MA1 transmits only the MC group address to the translator T1 when the MC server address corresponding to the MC group address is not held in the IPv6 MC address managing table;

the translator T1 generates the virtual MC group address corresponding to the MC group address, registers the virtual MC group address into the IPv6 MC address translation table and transmits the virtual MC group address to the DNS proxy D3;

the DNS proxy D3 registers the received virtual MC group address into the IPv6 MC address managing table and transmits the virtual MC group address to the IPv4 DNS server D1; and the IPv4 DNS server D1 transmits the virtual MC group address of the MC server of the domain concerned to the MC client of the IPv4 network NW1.

According to the fifth aspect of the present invention, there is provided a communication system comprising:

an IPv4 network for transferring packets according to an IPv4 multicast (MC) address;

an IPv6 for transferring packets according to an IPv6 MC address;

an MC adaptive translator T1 that has an IPv4 MC address translation table for storing MC group address and MC server address of IPv4 and virtual MC group address and virtual MC server address of IPv6 in association with one another, mutually connects the IPv4 network and the IPv6 network to each other and carries out IPv4-IPv6 MC packet conversion;

an IPv4 domain Name System (DNS) server D1 having an MC address managing table for storing a domain, an MC group address and an MC server address in association with one another;

an IPv6 DNS server D2 for responding to a DNS request from an IPv6 MC client; and a DNS proxy D3 of the IPv6 network having an IPv4 MC address managing table for storing a domain, an MC group address, an MC server address, a virtual MC group address and a virtual MC server address in association with one another, wherein the MC client of the IPv6 network transmits a DNS request 1 as an MC address notifying request to the IPv6

DNS server D2 by using as a key a domain of an MC server of the IPv4 network whose contents are wished to be viewed/listened;

the IPv6 DNS server D2 transmits a DNS request 2 of the domain concerned to the DNS proxy D3;

the DNS proxy D3 transmits a DNS request 3 of the domain concerned while a virtual IPv6 unicast address of the IPv4 DNS server D1 existing in the IPv4 network is set as a destination address;

the IPv4 DNS server D1 searches the MC address managing table to return the MC group address and the MC server address of the MC server of the domain concerned to the DNS proxy D3;

the DNS proxy D3 registers the received MC group address and MC server address into the IPv4 MC address managing table and transmits a request for generating the IPv6 virtual MC group address and IPv6 virtual MC server address corresponding to both the addresses concerned to the translator T1;

the translator T1 generates the IPv6 virtual MC group address and the IPv6 virtual MC server address corresponding to the received MC group address and MC server address, registers the IPv6 virtual MC group address into the IPv4 MC address translation table and then returns the IPv6 virtual MC group address to the DNS proxy D3;

the DNS proxy D3 registers the received virtual MC group address and virtual MC server address into the IPv4 MC address managing table and transmits the virtual MC group address and the virtual MC server address to the IPv6 DNS server D2; and the IPv6 DNS server D2 transmits the virtual MC group address and the virtual MC server address of the MC server of the domain to the MC client of the IPv6 network.

According to the sixth aspect of the present invention, there is provided a communication system comprising:

an IPv4 network for transferring packets according to an IPv4 multicast (MC) address;

an IPv6 for transferring packets according to an IPv6 MC address;

an MC adaptive translator T1 that has an IPv4 MC address translation table for storing MC group address and MC server address of IPv4 and virtual MC group address and virtual MC server address of IPv6 in association with one another, mutually connects the IPv4 network and the IPv6 network to each other and carries out IPv4-IPv6 MC packet conversion;

an IPv4 domain Name System (DNS) server D1 having an MC address managing table for storing a domain, an MC group address and an MC server address in association with one another;

an IPv6 DNS server D2 for responding to a DNS request from an IPv6 MC client;

a DNS proxy D3 of the IPv6 network having an IPv4 MC address managing table for storing a domain, an MC group address, an MC server address, a virtual MC group address and a virtual MC server address in association with one another; and an MC server address managing server MA1 having an IPv4 MC address managing table for managing the MC group address and the MC server address, wherein the MC client of the IPv6 network transmits a DNS request 1 as an MC address notifying request to the IPv6 DNS server D2 by using as a key a domain of an MC server of the IPv4 network whose contents are wished to be viewed/listened;

the IPv6 DNS server D2 transmits a DNS request 2 of the domain concerned to the DNS proxy D3;

the DNS proxy D3 transmits a DNS request 3 of the domain concerned while a virtual IPv6 unicast address of the IPv4 DNS server D1 existing in the IPv4 network is set as a destination address;

the IPv4 DNS server D1 searches the MC address managing table, and transmits only the MC group address of the MC server of the domain concerned when the MC server address of the MC server of the domain concerned is not held in the table;

the DNS proxy D3 registers the received MC group address into the IPv4 MC address managing table and transmits a request for generating the virtual MC group address corresponding to the MC group address to the translator T1;

the translator T1 registers the received MC group address into the IPv4 MC address translation table, searches the IPv4 MC address translation table, and transmits a request for notifying the MC server address to the MC server address managing server MA1 by using the MC group address as a key, when the MC server address corresponding to the MC group address is not held;

the MC server address managing server MA1 searches the MC server address corresponding to the MC group address, and transmits the MC server address to the translator T1;

the translator T1 generates the IPv6 virtual MC server address corresponding to the received MC server address and the IPv6 virtual MC group address corresponding to the MC group address, registers the IPv6 virtual MC server address and the IPv6 virtual MC group address into the IPv4 MC address MC address translation table and transmits the IPv6 virtual MC server address and the IPv6 virtual MC group address to the DNS proxy D3;

the DNS proxy D3 registers the received virtual MC group address and virtual MC server address into the IPv4 MC address managing table and transmits the virtual MC group address and the virtual MC server address to the IPv6 DNS server D2; and the IPv6 DNS server D2 transmits the virtual MC group address and the virtual MC server address of the MC server of the domain to the MC client of the IPv6 network.

According to the seventh aspect of the present invention, there is provided a communication system comprising:

an IPv4 network for transferring packets according to an IPv4 multicast (MC) address;

an IPv6 for transferring packets according to an IPv6 MC address;

an MC adaptive translator T1 that has an IPv4 MC address translation table for storing MC group address and MC server address of IPv4 and virtual MC group address and virtual MC server address of IPv6 in association with one another, mutually connects the IPv4 network and the IPv6 network to each other and carries out IPv4-IPv6 MC packet conversion;

an IPv4 domain Name System (DNS) server D1 having an MC address managing table for storing a domain, an MC group address and an MC server address in association with one another;

an IPv6 DNS server D2 for responding to a DNS request from an IPv6 MC client;

a DNS proxy D3 of the IPv6 network having an IPv4 MC address managing table for storing a domain, an MC group address, an MC server address, a virtual MC group address and a virtual MC server address in association with one another; and an MC server address managing server MA1 having an IPv4 MC address managing table for managing the MC group address and the MC server address, wherein the MC client of the IPv6 network transmits a DNS request 1 as an MC address notifying request to the IPv6

DNS server D2 by using as a key a domain of an MC server of the IPv4 network whose contents are wished to be viewed/listened;

the IPv6 DNS server D2 transmits a DNS request 2 of the domain concerned to the DNS proxy D3;

the DNS proxy D3 transmits a DNS request 3 of the domain concerned while a virtual IPv6 unicast address of the IPv4 DNS server D1 existing in the IPv4 network is set as a destination address;

the IPv4 DNS server D1 searches the MC address managing table, and transmits only the MC group address of the MC server of the domain concerned when the MC server address of the MC server of the domain concerned is not held in the table;

the DNS proxy D3 registers the received MC group address into the IPv4 MC address managing table and transmits a request for generating the virtual MC group address corresponding to the MC group address to the translator T1;

the translator T1 generates the virtual MC group address and the virtual MC server address corresponding to an MC group address and an MC server address, registers the virtual MC group address and the virtual MC server address in the IPv4 MC address translation table and returns the virtual MC group address and the virtual MC server address to the DNS proxy D3, when a table for the MC group address and the MC server address of the domain concerned has been already held in the IPv4 MC address translation table at the previous DNS request of the MC client;

the DNS proxy D3 registers the received virtual MC group address and virtual MC server address into the IPv4 MC address managing table and transmitting the virtual MC group address and the virtual MC server address to the IPv6 DNS server D2; and the IPv6 DNS server D2 transmits the virtual MC group address and the virtual MC server address of the MC server of the domain to the MC client of the IPv6 network.

According to the eighth aspect of the present invention, there is provided a communication system comprising:

an IPv4 network for transferring packets according to an IPv4 multicast (MC) address;

an IPv6 for transferring packets according to an IPv6 MC address;

an MC adaptive translator T1 that has an IPv4 MC address translation table for storing MC group address and MC server address of IPv4 and virtual MC group address and virtual MC server address of IPv6 in association with one another, mutually connects the IPv4 network and the IPv6 network to each other and carries out IPv4-IPv6 MC packet conversion;

an IPv4 domain Name System (DNS) server D1 having an MC address managing table for storing a domain, an MC group address and an MC server address in association with one another;

an IPv6 DNS server D2 for responding to a DNS request from an IPv6 MC client;

a DNS proxy D3 of the IPv6 network having an IPv4 MC address managing table for storing a domain, an MC group address, an MC server address, a virtual MC group address and a virtual MC server address in association with one another; and an MC server address managing server MA1 having an IPv4 MC address managing table for managing the MC group address and the MC server address, wherein the MC client of the IPv6 network transmits a DNS request 1 as an MC address notifying request to the IPv6 DNS server D2 by using as a key a domain of an MC server of the IPv4 network whose contents are wished to be viewed/listened;

the IPv6 DNS server D2 transmits a DNS request 2 of the domain concerned to the DNS proxy D3;

the DNS proxy D3 transmits a DNS request 3 of the domain concerned while a virtual IPv6 unicast address of the IPv4 DNS server D1 existing in the IPv4 network is set as a destination address;

the IPv4 DNS server D1 searches the MC address managing table, and transmits only the MC group address of the MC server of the domain concerned when the MC server address of the MC server of the domain concerned is not held in the table;

the DNS proxy D3 registers the received MC group address into the IPv4 MC address managing table and transmits a request for generating the virtual MC group address corresponding to the MC group address to the translator T1;

the translator T1 registers the received MC group address into the IPv4 MC address translation table, searches the IPv4 MC address translation table and transmits a request for notifying the MC server address to the MC server address managing server MA1 by using the MC group address as a key, when the MC server address corresponding to the MC group address is not held;

the MC server address managing server MA1 transmits only the MC group address to the translator T1 when the MC server address corresponding to the MC group address is not held in the IPv4 MC managing table;

the translator T1 generates the virtual MC group address corresponding to the MC group address, registers the virtual MC group address in the IPv4 MC address translation table and transmits the virtual MC group address to the DNS proxy D3;

the DNS proxy D3 registers the received virtual MC group address into the IPv4 MC address managing table and transmits the virtual MC group address to the IPv6 DNS server D2; and the IPv6 DNS server D2 transmits the virtual MC group address of the MC server of the domain to the MC client of the IPv6 network.

According to the present invention, the IPv4-IPv6 multicast address translation table can be dynamically created, and it is unnecessary to pre-register the multicast server.

Furthermore, according to the present invention, the multicast address translation table in which the IPv4-IPv6 multicast server address is registered can be dynamically created, and the multicast service using IGMPv3-MLDv2 can be performed.

BRIEF DESCRIPTION OF THE DRAWINGS

FIG. 3A is a diagram showing the construction of an IPv6 multicast address translation table in the multicast adaptive translator;

FIG. 3B is a diagram showing the construction of the IPv6 multicast address translation table in the multicast adaptive translator;

FIG. 3C is a diagram showing the construction of the IPv6 multicast address translation table in the multicast adaptive translator;

FIGS. 3D-3G are diagrams showing the construction of the IPv6 multicast address translation table in the multicast adaptive translator;

FIG. 4A is a diagram showing the construction of an IPv6 multicast address managing table in DNS Proxy;

FIG. 4B is a diagram showing the construction of the IPv6 multicast address managing table in DNS Proxy;

FIG. 4C is a diagram showing the construction of the IPv6 multicast address managing table in DNS Proxy;

FIGS. 4D-4F are diagrams showing the construction of the IPv6 multicast address managing table in DNS Proxy;

FIGS. 17A-17B are diagrams showing the construction of the IPv4 multicast address translation table in the multicast adaptive translator;

FIGS. 18A-18B are diagrams showing the construction of the IPv4 multicast address managing table in DNS Proxy;

FIG. 19 is a diagram showing of the multicast address managing table in the IPv4 DNS server;

FIG. 20 is a diagram showing the construction of the IPv4 multicast address managing table in the multicast server address managing server of the present invention.

DETAILED DESCRIPTION OF THE PREFERRED EMBODIMENTS

Preferred embodiments according to the present invention will be described hereunder with reference to the accompanying drawings.

1. Embodiment 1

1-1. System Construction

Figure 1:
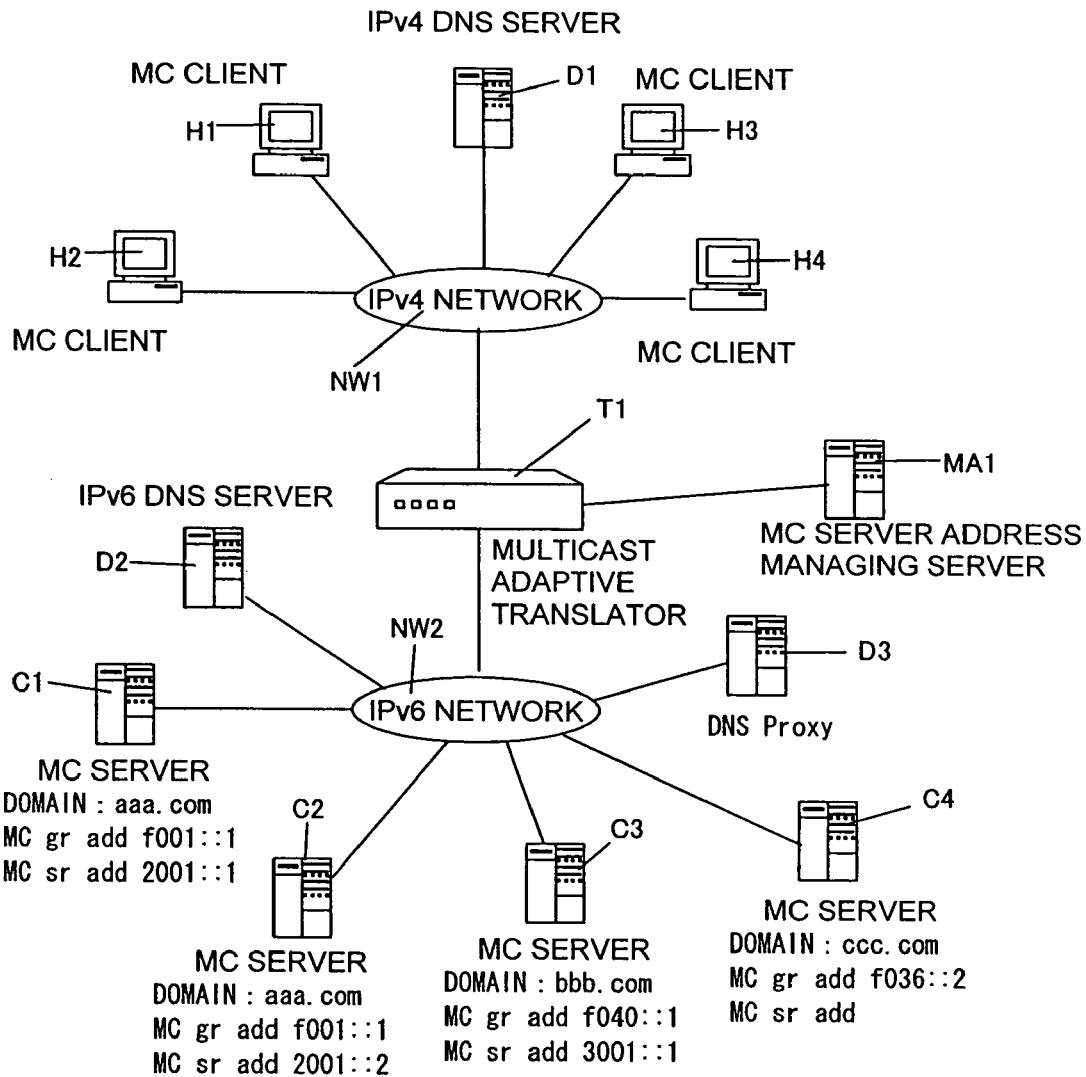
FIG. 1 is a diagram showing the construction of a communication system according to first to fourth embodiments.

FIG. 1 is a diagram showing the construction of a network to which a multicast adaptive translator T1 having an IP multicast address translation function of a first embodiment and carrying out packet transfer is applied.

This system is particularly directed to a construction that multicast clients H1 to H4 of an IPv4 network NW1 views/ listens to contents of multicast servers C1 to C4 of an IPv6 network NW2. This system is equipped with the IPv4 network NW1 for transmitting packets according to IPv4 multicast addresses, the IPv6 network NW2 for transmitting packets according to IPv6 multicast addresses, a translator T1 for mutually connecting the IPv4 network NW1 and the IPv6 network NW2, a multicast server address managing server MA1 connected to the translator T1, DNS servers D1, D2 for the respective IP networks, and a DNS Proxy D3 for the IPv6 network NW2.

With respect to the multicast servers C1 to C4, the number of multicast servers being used is varied in accordance with the service content and thus there is provided a multicast server address managing server MA1 that is flexibly adaptive to the increase/decrease of the number of the multicast servers and manages the multicast group address and the multicast server address. The multicast server address managing server MA1 may be omitted from the first embodiment.

In the first embodiment, the IPv4 network NW1 is provided with multicast clients H1 to H4, and the clients H1 to H4 make a contract with content business enterprises about viewable and audible contents. The IPv6 network NW2 is provided with multicast servers C1 to C4, and distributes contents to the multicast clients to which multicast addresses are provided.

Figure 2:
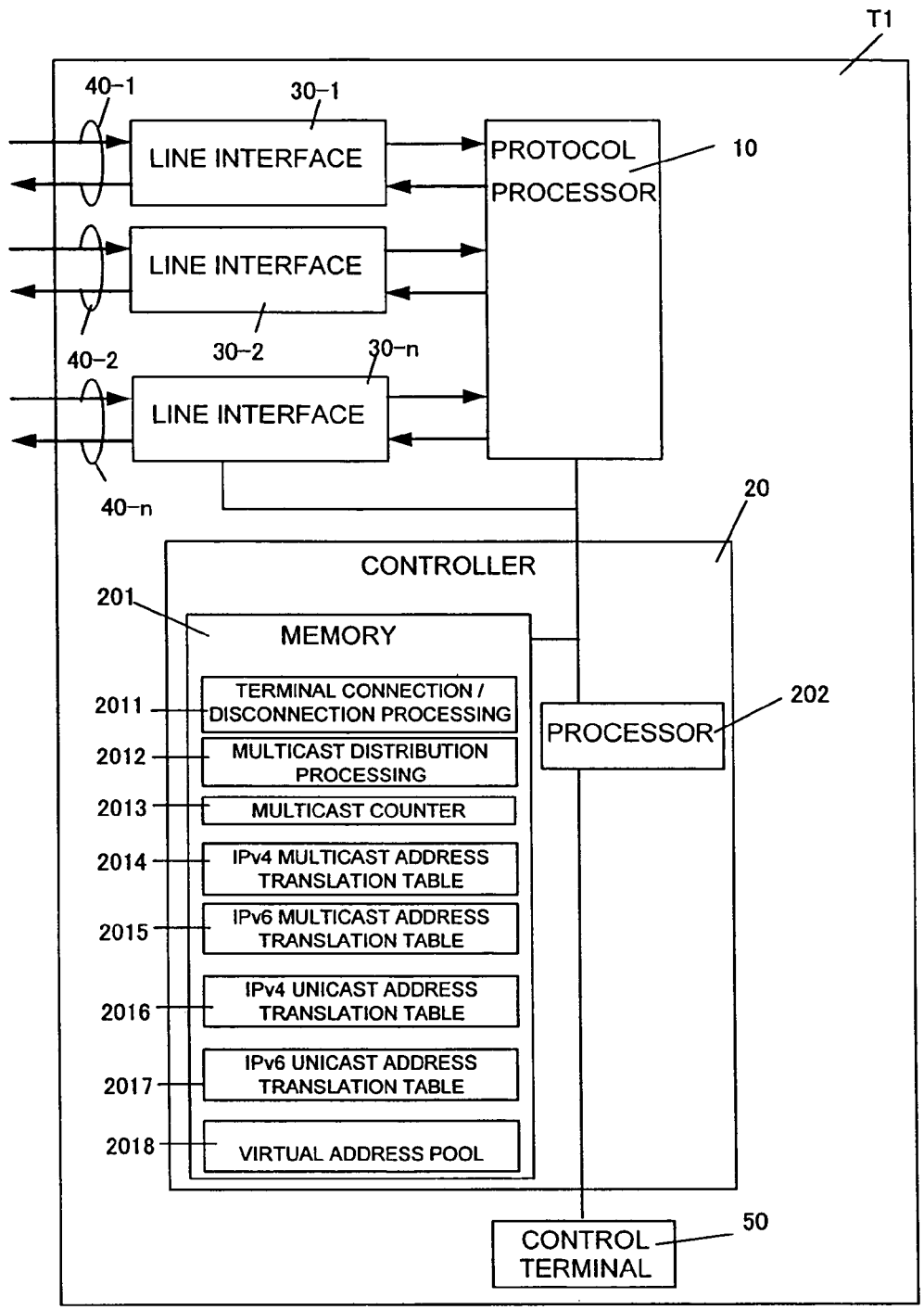
FIG. 2 is a diagram showing the construction of a multicast adaptive translator.

FIG. 2 is a diagram showing the construction of the translator T1.

The translator T1 is equipped with line interfaces 30-1 to 30-n (n represents a natural number) of plural input/output lines, a protocol processor 10 for carrying out packet conversion of IGMP-MLD and a controller 20 for controlling the above parts and carry out address translation. This control may be carried out by a control terminal 50.

The controller 20 is equipped with a memory 201 for storing processing programs 2011 to 2013, respective tables 2014 to 2017 and a virtual address pool 2018, and a processor 202 for executing processing programs 2011 to 2013.

In the memory 201 are stored, as the processing programs to be executed in the processor 202, a terminal connection/ disconnection processing program 2011 for connecting/disconnecting a terminal to/from the Internet, a multicast distribution processing program 2012 for carrying out multicast routing, multicast address translation and copy and transfer of multicast packets and a multicast counter 2013 used when the number of distributed bytes and the number of packets are counted every multicast group address to execute multicast charging processing.

In the memory 201 are further stored, as tables, an IPv4 multicast address translation table 2014 for managing a multicast group address, a multicast server address, a virtual multicast group address, a virtual multicast server address, an IPv6 multicast address translation table 2015, an IPv4 unicast address translation table 2016 for managing a virtual IP unicast address, an IPv6 unicast address translation table 2017 and a virtual address pool 2018 for storing virtual multicast addresses to be released.

FIG. 3 is a diagram showing the construction of the IPv6 multicast address translation table 2015 in the translator T1.

The IPv6 multicast address translation table 2015 contains a IPv6 multicast group address 20151, an IPv6 multicast server address 20152, an IPv4 virtual multicast group address 20153 and an IPv4 virtual multicast server address 20154.

The multicast group address 20151 and the multicast server address 20152 are registered in the IPv6 multicast address translation table 2015 after the translator T1 receives the multicast group address and the multicast server address from the DNS Proxy D3.

The virtual multicast group address 20153 and the virtual multicast server address 20154 are registered in the IPv6 multicast address translation table 2015 after the translator T1 creates the virtual multicast group address and the virtual multicast server address corresponding to the multicast group address and the multicast server address received from the DNS Proxy D3.

After the translator T1 translates Leave Group corresponding to a multicast leave message received from the multicast client (H1 to H4) of the IPv4 network NW1 into an IPv6 multicast address and transmits the translated IPv6 multicast address to the multicast server (C1 to C4) of the IPv6 network NW2, the series of information is deleted from the IPv6 multicast address managing table 2015.

FIG. 4 is a diagram showing the construction of the IPv6 multicast address managing table 6000 in the DNS Proxy D3.

The IPv6 multicast address managing table 6000 contains a domain 60001, an IPv6 multicast group address 60002, an IPv6 multicast server address 60003, an IPv4 virtual multicast group address 60004, and an IPv4 virtual multicast server address 60005.

The domain 60001 is registered in the IPv6 multicast address managing table 6000 after the DNS Proxy D3 receives a DNS request from the IPv4 DNS server D1.

Furthermore, the multicast group address 60002 and the multicast server address 60003 are registered in the IPv6 multicast address managing table 6000 after the DNS Proxy D3 receives the multicast group address and the multicast server address from the DNS server D2.

The virtual multicast group address 60004 and the virtual multicast server address 60005 are registered in the IPv6 multicast address managing table 6000 after the DNS Proxy D3 receives the virtual multicast group address and the virtual multicast server address.

After the DNS Proxy D3 notifies the virtual multicast group address and the virtual multicast server address to the IPv4 DNS server D1, the virtual multicasts group address 60004 and the virtual multicast server address 60005 are deleted by the IPv6 multicast address managing table 6000.

Figure 5:
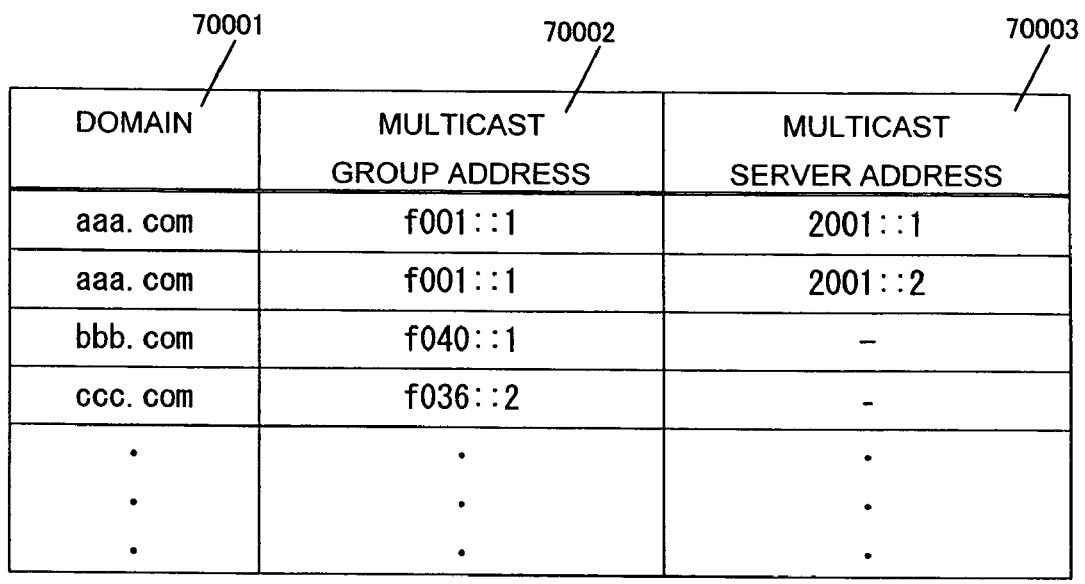
FIG. 5 is a diagram showing the construction of a multicast address managing table in IPv6 DNS server.

FIG. 5 is a diagram showing the construction of a multicast address managing table 7000 in the IPv6 DNS server D2.

The multicast address managing table 7000 contains a domain 70001, an IPv6 multicast group address 70002 and an IPv6 multicast server address 70003. The information in the multicast address managing table 7000 is held in the IPv6 DNS server D2 in advance.

Figure 6:
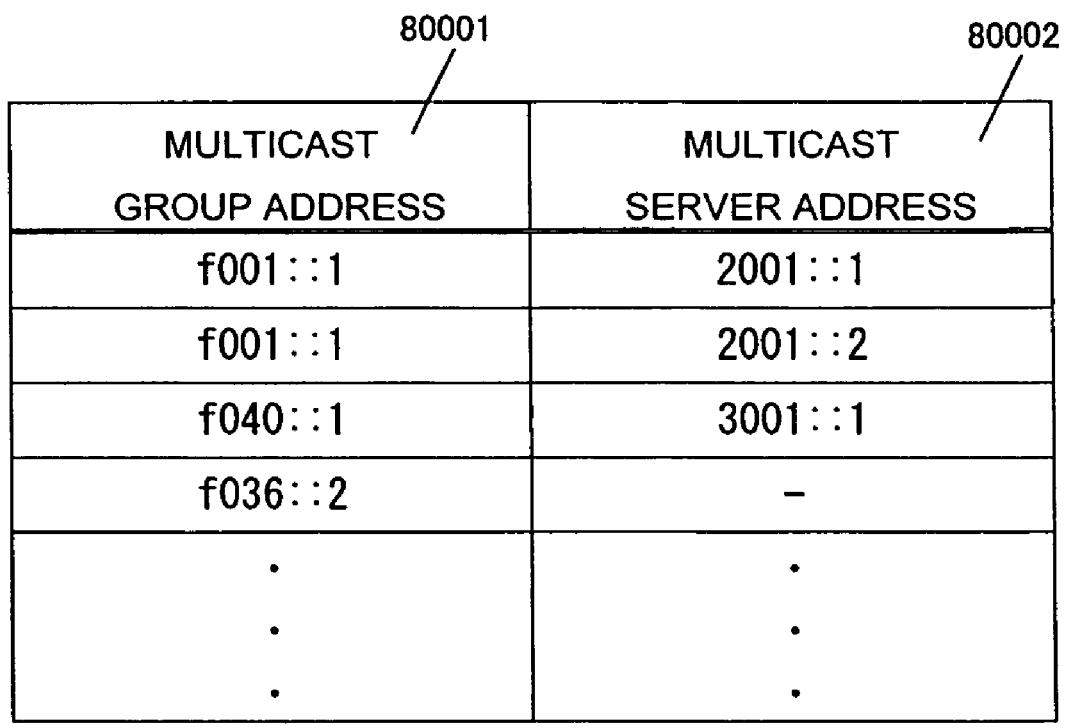
FIG. 6 is a diagram showing the construction of the IPv6 multicast address managing table in a multicast server address management server.

FIG. 6 is a diagram showing the construction of an IPv6 multicast address managing table 8000 in the multicast server address managing server MA1. The multicast server address managing server MA1 is used in second and third embodiments, etc.

The IPv6 multicast address managing table 8000 contains the IPv6 multicast group address 80001 and the IPv6 multicast server address 80002.

The information in the IPv6 multicast address managing table 8000 for managing the multicast group address and the multicast server address is renewed in accordance with the number of multicast server being used whose number is increased/reduced in accordance with the content distributing service content (program, time zone, etc.).

1-2. Processing

Figure 7:
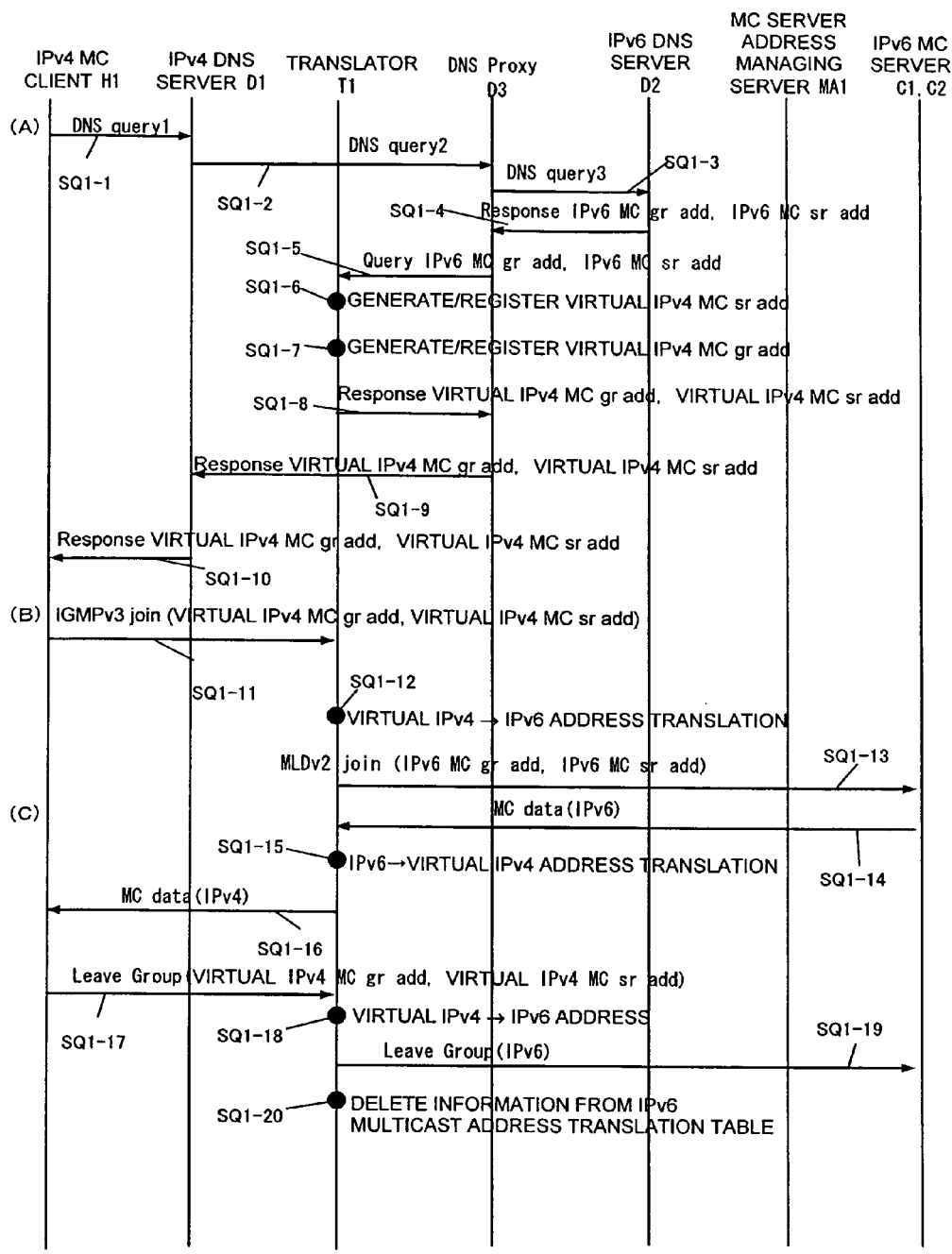
FIG. 7 is a diagram showing a sequence of the first embodiment.
Figure 8:
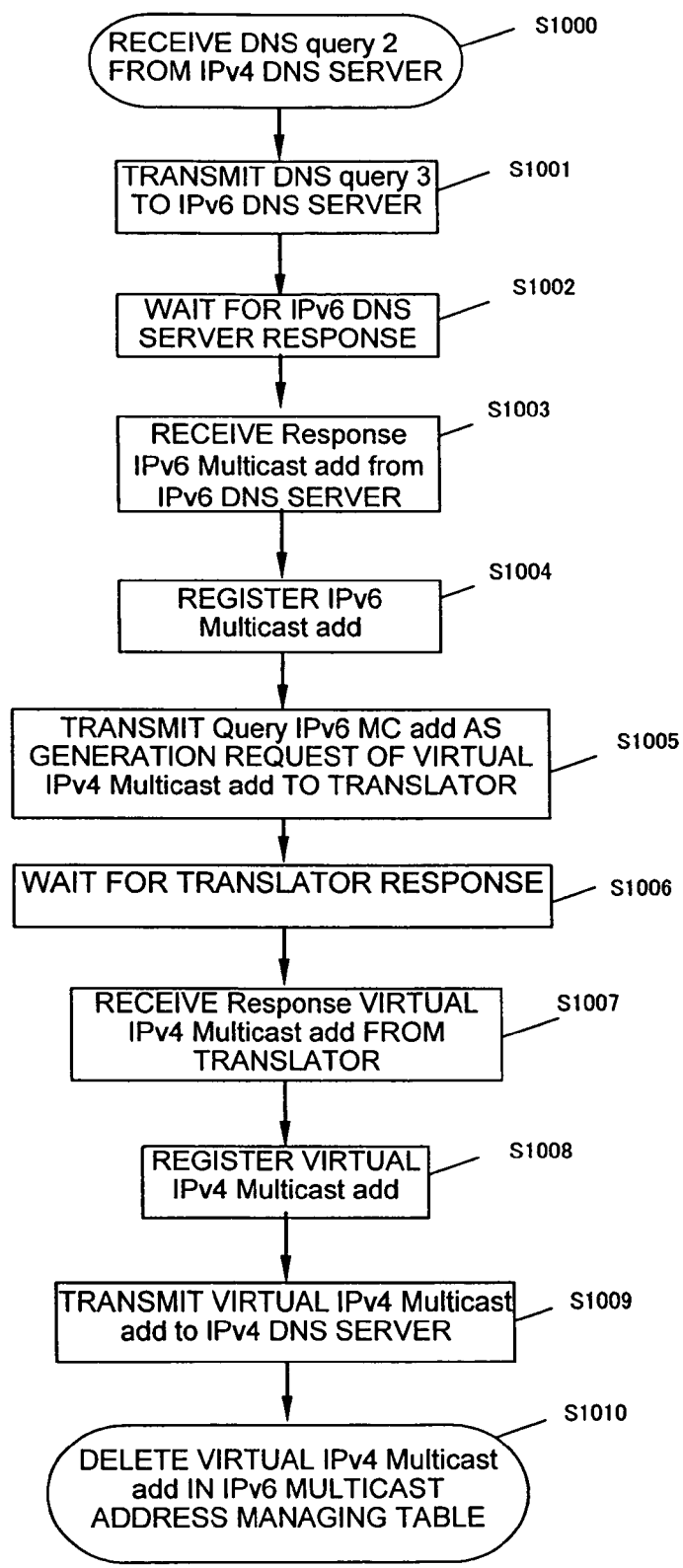
FIG. 8 is a flowchart showing the processing in DNS Proxy of the first to fourth embodiments.
Figure 9:
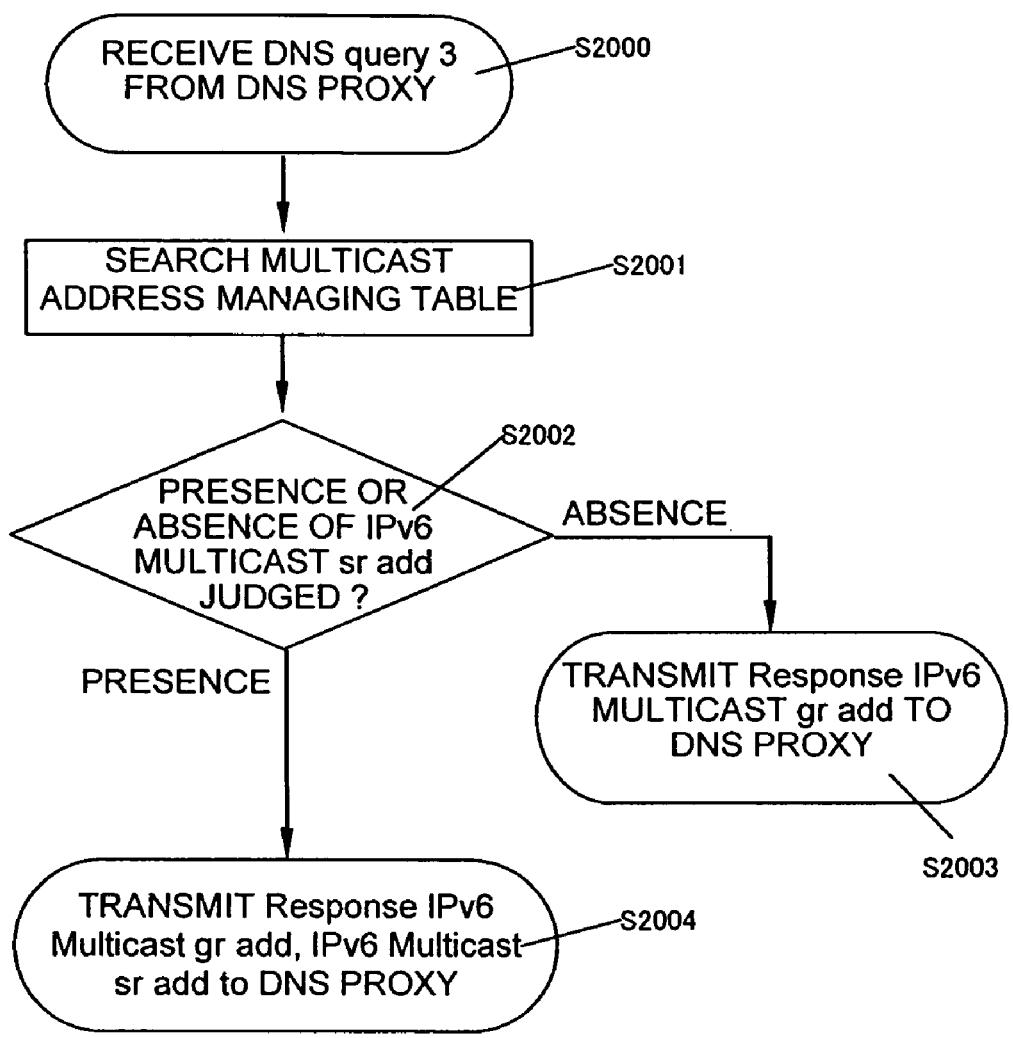
FIG. 9 is a flowchart showing the processing in IPv6 DNS server of the first to fourth embodiments.
Figure 10:
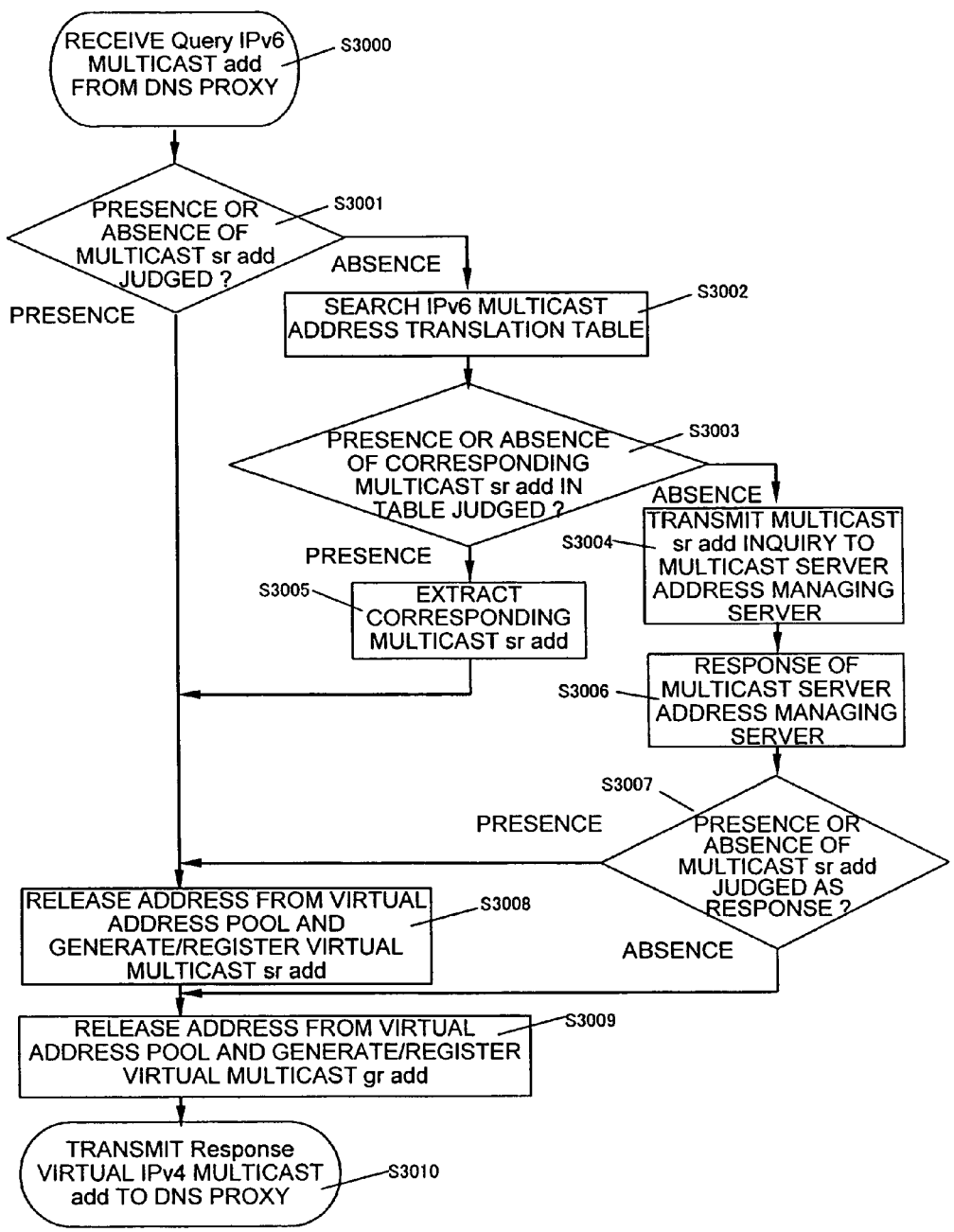
FIG. 10 is a flowchart showing the processing in a multicast adaptive translator of the first to fourth embodiments.

FIG. 7 is a sequence diagram SQ1 when the IPv6 DNS server D2 of the first embodiment notifies the multicast server address, FIG. 8 is a flowchart showing the processing in DNS Proxy D3, FIG. 9 is a flowchart showing the processing in the IPv6 DNS server D2, and FIG. 10 is a flowchart showing the processing in the translator T1. Each processing is mainly executed by a processor 202.

Figure 11:
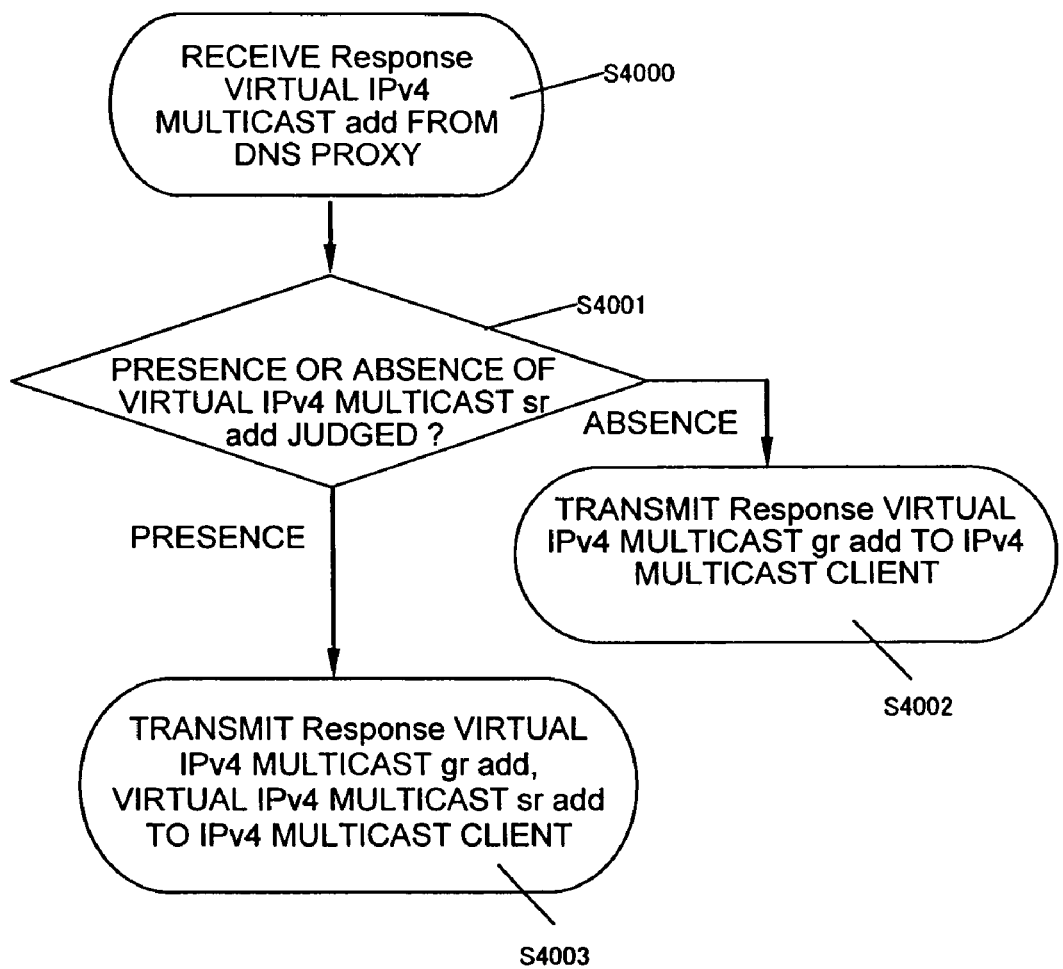
FIG. 11 is a flowchart showing the processing in the IPv4 DNS server according to first to fourth embodiments.

FIG. 11 is a flowchart showing the processing in the IPv4 DNS server D1.

"A. MC address achievement", "B. join transmission" and "C. content distribution" will be described hereunder.

A. MC Address Achievement

First, the multicast client H1 of the IPv4 network NW1 transmits DNS query 1 as a multicast address notification request to the IPv4 DNS server D1 with the domain aaa.com of the multicast server (C1, C2) of the IPv6 network whose content is wished to be viewed by the multicast client H1 of the IPv4 network NW1 (SQ1-1).

The information of the multicast server (C1, C2) existing in the IPv6 network NW2 is not held in the IPv4 DNS server D1. Therefore, the IPv4 DNS server D1 transmits DNS query 2 of the domain aaa.com with the virtual IPv4 unicast address of DNS Proxy D3 provided in the IPv6 network NW2 set as a destination address (SQ1-2). At this time, the translator T1 refers to the IPv6 unicast address translation table 2017 held in advance to translate the virtual IPv4 unicast address of DNS Proxy D3 to the IPv6 unicast address, and transmits DNS query 2 from the IPv4 DNS server D1 to DNS Proxy D3.

As shown in the processing flow in DNS Proxy D3 of FIG. 8, DNS Proxy D3 transmits the IPv6 DNS server D2 to the DNS query 3 of the domain aaa.com (SQ1-3, FIG. 8: S1001).

As shown in the processing flow of the IPv6 DNS server D2 of FIG. 9, the IPv6 DNS server D2 searches the multicast address managing table 7000 which is held in advance (FIG. 9: S2001). At the search time, the IPv6 DNS server D2 judges whether the multicast server address is held in the table of the multicast server (C1, C2) of the domain aaa.com (FIG. 9: S2002). In the case of the multicast server (C1, C2) of the domain aaa.com, the multicast group address and the multicast server addresses are registered and held by a maintenance worker or the like, and thus the multicast group address (f001::1) and the multicast server addresses (2001::1, 2001::2) of the domain aaa.com are transmitted as Response to DNS Proxy D3 (SQ1-4, FIG. 9: S2004), DNS Proxy D3 registers the multicast group address (f001::1) and the multicast server addresses (2001::1, 2001::2) of the domain aaa.com received by the DNS server D2 (FIG. 8: S1003) in the IPv6 multicast address managing table 6000 in association with the domain aaa.com (FIG. 4(*a*), FIG. 8: S1004).

DNS Proxy D3 uses the multicast group address (f001::1) and the multicast server addresses (2001::1, 2001::2) received from the DNS server D2 as a key to transmit Query IPv6 MC add as a generation request for the virtual multicast group address and the virtual multicast server addresses corresponding to the address to the translator T1 (SQ1-5, FIG. 8: S1005).

The translator T1 registers the multicast group address (f001::1) and the multicast server addresses (2001::1, 2001::2) received from DNS Proxy D3 (FIG. 10: S3000) into the IPv6 multicast address translation table 2015 (FIG. 3:(*a*)). At this time, it is judged in the translator T1 whether the multicast server address is held in the information of Query IPv6 MC add received from the DNS Proxy D3 (FIG. 10: S3001). In the case of the multicast server (C1, C2) of the domain aaa.com, the multicast group address and the multicast server address are registered and held in DNS Proxy D3 by the maintenance worker, and thus the multicast server address is held in the information of the received Query IPv6 MC add.

Subsequently, the translator (T1) randomly releases virtual addresses stored in the virtual address pool 2018 within the storage range, and generates the IPv4 virtual multicast server addresses (192.0.1.1, 192.0.1.2) corresponding to the multicast server addresses (2001::1, 2001::2) of the multicast servers C1, C2 of the domain aaa.com. The addresses to be released are stored in the virtual address pool 2018, and the processor 202 refers to the virtual address pool 2018 to release the virtual addresses randomly. In the translator T1, the IPv4 virtual multicast server addresses (192.0.1.1, 192.0.1.2) corresponding to the multicast server addresses (2001::1, 2001::2) of the multicast servers C1, C2 of the domain aaa.com are generated, and then the virtual multicast server addresses are registered in the IPv6 multicast address translation table 2015 (SQ1-6, FIG. 10: S3008, (b) of FIG. 3). Furthermore, in the translator T1, the virtual addresses stored in the virtual address pool 2018 within the storage range are randomly released, and the IPv4 virtual multicast group address (238.0.0.1) corresponding to the multicast group address (f001::1) of the multicast server (C1, C2) of the domain aaa.com is generated and registered in the IPv6 multicast address translation table 2015 (SQ1-7, FIG. 10: S3009, (b) of FIG. 3).

In the translator T1, the virtual multicast group address 238.0.0.1 and the virtual multicast server addresses 192.0.1.1., 192.0.1.2 thus generated are transmitted as Response to DNS Proxy D3 (SQ1-8, FIG. 10: S3010).

In DNS Proxy D3, the virtual IPv4 multicast group address 238.0.0.1 and the virtual multicast server addresses 192.0.1.1 and 192.0.1.2 received from the translator T1 (FIG. 8: S1007) are registered in the IPv6 multicast address managing table 6000 (FIG. 8: S1008, (b) of FIG. 4).

After the registration of the above addresses into the IPv6 multicast address managing table (6000), DNS Proxy D3 transmits the virtual multicast group address 238.0.0.1 and the virtual multicast server addresses 192.0.1.1 and 192.0.1.2 of the domain aaa.com as Response to the IPv4 DNS server D1 (SQ1-9, FIG. 8: S1009).

In DNS Proxy D3, after transmission of the virtual multicast group address (238.0.0.1) and the virtual multicast server addresses (192.0.1.1., 192.0.1.2) of the multicast servers C1, C2 of the domain aaa.com to the IPv4 DNS server D1, the virtual multicast group address and the virtual multicast server addresses of the multicast servers C1, C2 of the domain aaa.com held in the IPv6 multicast address managing table 6000 are deleted from the table (FIG. 8: S1010).

In the IPv4 DNS server D1, it is judged whether the virtual multicast server address is held in the information of the Response virtual IPv4 MC add received from DNS Proxy D3 (FIG. 11: S4001). In the case of the multicast servers C1, C2 of the domain aaa.com, the IPv4 virtual multicast group address and the IPv4 virtual multicast server addresses are held in the information of the Response virtual IPv4 MC add and thus the IPv4 DNS server D1 transmits the virtual multicast group address (238.0.0.1) and the virtual multicast server addresses (192.0.1.1, 192.0.1.2) of the domain aaa-.com as Response to the multicast client H1 of the IPv4 network (SQ1-10, FIG. 11: S4003).

B. Join Transmission

Subsequently, the multicast client H1 transmits join of IGMPv3 while addressing to the virtual multicast group address 238.0.0.1 and the virtual multicast server addresses 192.0.1.1, 192.0.1.2 (SQ1-11).

In the translator T1, join of IGMPv3 of the multicast client H1 is received, and the IPv6 multicast address translation table 2015 is referred to in the controller 20 to translate the virtual multicast group address 238.0.0.1 of IGMPv3 to the IPv6 multicast group address f001::1 of MLDv2 and translate the virtual multicast server addresses 192.0.1.1, 192.0.1.2 of IGMPv3 to the IPv6 multicast server addresses 2001::1, 2001::2 of MLDv2 (SQ1-12), and then transmits MLDv2 join to the multicast servers C1, C2 of the IPv6 network NW2 (SQ1-13).

C. Content Distribution

When the multicast server (C1, C2) of the IPv6 network NW2 distributes a content to the multicast client H1 of the IPv4 network NW1 (SQ1-14), the IPv6 multicast address translation table 2015 is referred to in the controller 20 of the translator T1 to translate the IPv6 multicast group address f001::1 to the virtual multicast group address 238.0.0.1 and translate the IPv6 multicast server addresses 2001::1, 2001::2 to the virtual multicast server addresses 192.0.1.1., 192.0.1.2 (SQ1-15), and then transmits the content distribution data of the IPv6 network NW2 to the multicast client H1 of the IPv4 network NW1 (SQ1-16).

Furthermore, when the translator T1 receives Leave Group as a multicast release message from the multicast client H1 of the IPv4 network NW1 (SQ1-17), the IPv6 multicast address translation table 2015 is referred to in the controller 20 of the translator T1 to translate the virtual multicast group address 238.0.0.1 to the IPv6 multicast group address f001::1 and translate the virtual multicast server addresses 192.0.1.1., 192.0.1.2 to the IPv6 multicast server addresses 2001::1, 2001::2 (SQ1-18), and then transmits Leave Group to the multicast servers C1, C2 of the IPv6 network NW2 (SQ1-19).

After the translator T1 transmits Leave Group to the multicast servers C1, C2 of the IPv6 network NW2, the information of the multicast servers C1, C2 is deleted from the IPv6 multicast address translation table 2015.

2. Second Embodiment

In the first embodiment, the IPv6 DNS server D2 notifies the multicast server address to the translator T1. However, according to the second embodiment, the multicast server address managing server MA1 that is flexibly adaptive to increase/decrease of the number of multicast servers being used which is varied in accordance with the service content, and manages the multicast group address and the multicast server addresses notifies the multicast server address to the translator T1.

The system construction, the respective tables 2015, 6000 and 7000 and the processing flowcharts of the respective servers T1, D1, D2, D3, etc. are the same as shown in FIGS. 1 to 6, FIGS. 8 to 11 of the first embodiment. In the second embodiment, the MC server address managing server MA1 is further provided.

Figure 12:
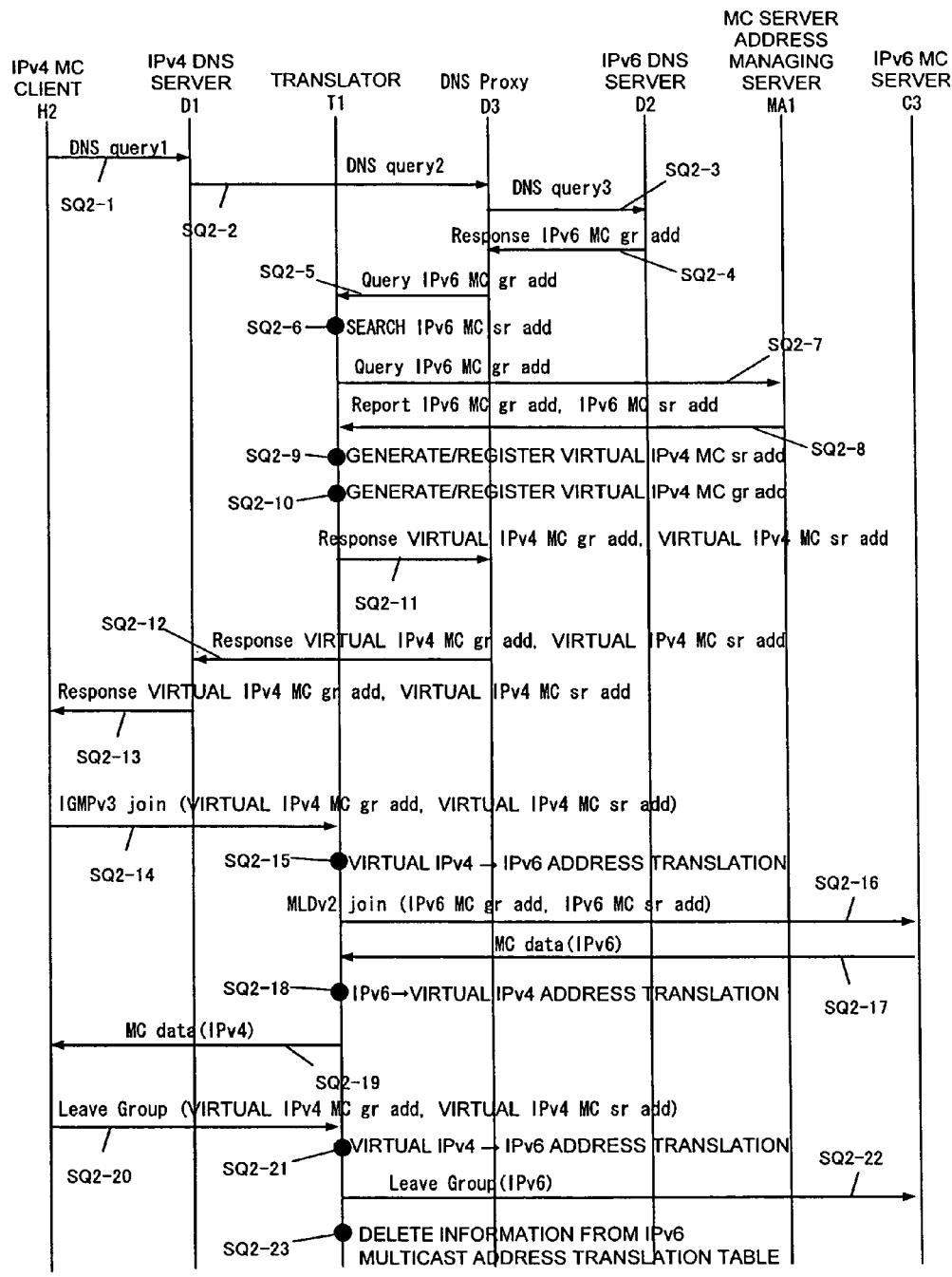
FIG. 12 is a diagram showing a sequence of the second embodiment.

FIG. 12 is a sequence diagram SQ2 when the multicast server address managing server MA1 of the second embodiment notifies the multicast server address.

Figure 13:
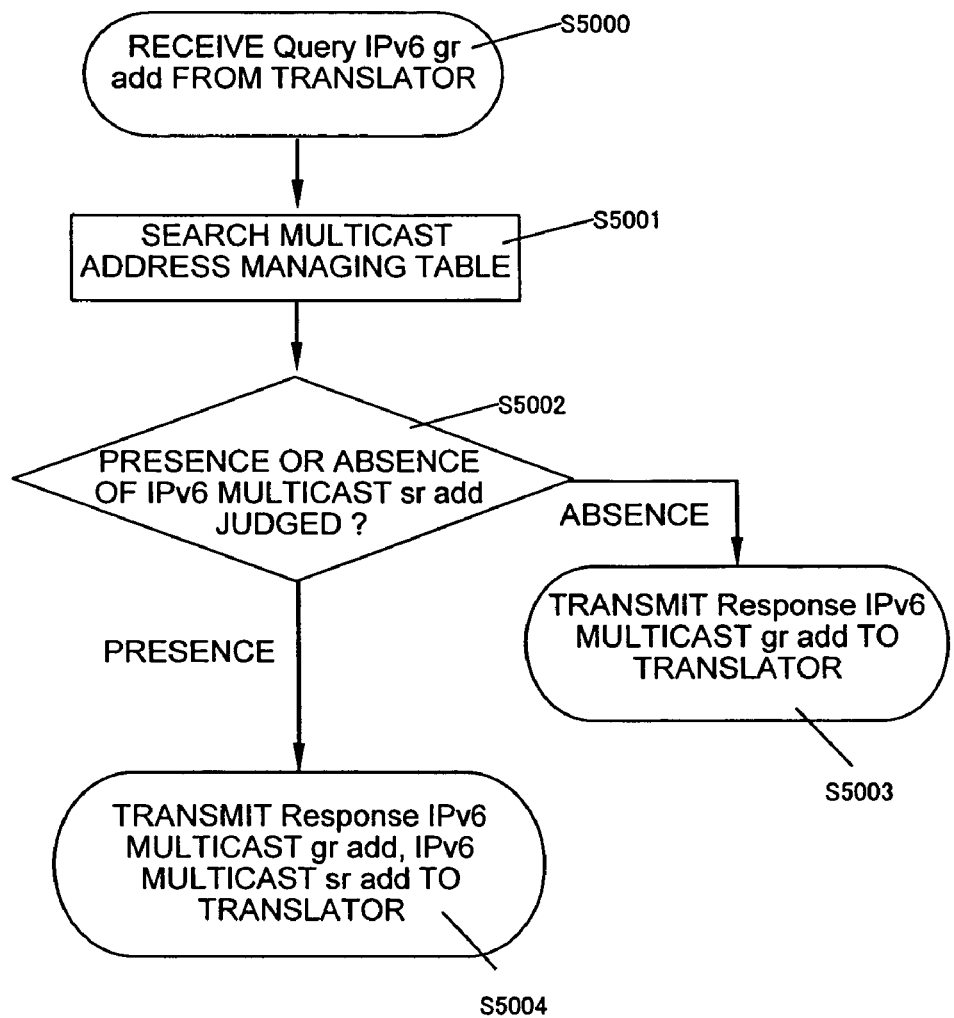
FIG. 13 is a flowchart showing the processing in a multicast server address managing server of the second and third embodiments.

FIG. 13 is a flowchart showing the processing of the multicast server address managing server MA1. The multicast client H1 of the IPv4 network NW1 transmits DNS query 1 as a multicast address notifying request to the IPv4 DNS server D1 by using as a key the domain bbb.com of the multicast server C3 of the IPv6 network NW2 whose contents are wished to be viewed by the multicast client H2 of the IPv4 network (SQ2-1).

The processing SQ2-2 and SQ2-3 are executed as in the case of the sequence SQ1 shown in FIG. 7 of the fist embodiment.

In IPv6 DNS server D2, after receiving DNS query 3 from DNS Proxy D3, the multicast address managing table 7000 held in advance in FIG. 5 is searched (FIG. 9: S2001). At the search time, the IPv6 DNS server D2 judges whether the multicast server address is held in the table of the multicast server C3 of the domain bbb.com (FIG. 9: S2002). In the case of the multicast server C3 of the domain bbb.com, the multicast server address is not registered and held by the maintenance worker, and thus only the multicast group address f040::1 of the multicast server C3 of the domain bbb.com is transmitted as Response to DNS proxy D3 (SQ2-4, FIG. 9: S2003).

DNS Proxy D3 registers the multicast group address f040::1 of the domain bbb.com received from the IPv6 DNS server D2 (FIG. 8: S1003) into the IPv6 multicast address managing table 6000 (FIG. 8: S1004, FIG. 4: (c)). By using the multicast group address f040::1 received from the IPv6 DNS server D2 (FIG. 8: S1003) as a key, DNS Proxy D3 transmits to the translator T1 Query IPv6 MC add as a request for generating the virtual multicast group address corresponding to the address (SQ2-5, FIG. 8: S1005).

In the translator T1, the multicast group address f040::1 received from DNS Proxy D3 (FIG. 10: S3000) is registered in the IPv6 multicast address translation table 2015 (FIG. 3: (c)). At this time, in the translator T1, it is judged whether the multicast server address is held in the information of Query IPv6 MC add received from DNS Proxy D3 (FIG. 10: S3001). In the case of the multicast server C3 of the domain bbb.com, the multicast server address is not registered in DNS Proxy D3 by the maintenance worker, and thus the IPv6 multicast address translation table 2015 held in advance is searched by using as a key the multicast group address f040::1 of the multicast server C3 of the domain bbb.com (SQ2-6, FIG. 10: S3002). At the search time, the translator T1 judges whether the multicast server address corresponding to the multicast group address f040::1 is held in the table (FIG. 10: S3003).

When the multicast server address is not held in the IPv6 multicast address translation table 2015, the Query IPv6 MC gr add as a notification request of the multicast server address is transmitted to the multicast server address managing server MA1 by using the multicast group address f040::1 of the multicast server C3 as a key (SQ2-7, FIG. 10: S3004).

The multicast server address managing server MA1 is a server for managing the table of the multicast group addresses and the multicast server addresses and performing the management of increasing/reducing the number of multicast servers in accordance with traffic. Furthermore, the multicast server address managing server MA1 renews the information in the IPv6 multicast address managing table 8000 for managing the multicast group addresses and the multicast server addresses in accordance with the number of multicast servers being used which increases/decreases in accordance with the content distribution service content (program, time zone, etc.).

The multicast server address managing server MA1 searches the IPv6 multicast address managing table 8000 by using as a key the multicast group address f040::1 received from the translator T1 (FIG. 13: S5001). At the search time, the multicast server address managing server MA1 judges whether the multicast server address corresponding to the multicast group address f040::1 of the multicast server C3 of the domain bbb.com is held in the table (FIG. 13: S5002). In the case of the multicast server C3 of the multicast group address f040::1, the multicast group address is held in the table, and thus the multicast server address (3001::1) corresponding to the multicast group address f040::1 is transmitted Report to the translator T1 (SQ2-8, FIG. 13: S5004).

The translator T1 registers the, multicast server address 3001::1 corresponding to the multicast group address f040::1 of the multicast server C3 of the domain bbb.com received from the multicast server address managing server MA1 into the IPv6 multicast address translation table 2015 (FIG. 3: (d)). At this time, the translator T1 judges whether the multicast server address is held in the information of Report IPv6 MC add received from the multicast server address managing server MA1 (FIG. 10: S3007). In the case of the multicast server C3 of the domain bbb.com, the multicast group address and the multicast server address are held in the information of Report IPv6 MC add. Therefore, the virtual addresses stored in the virtual address pool 2018 within the storage range are released, and the IPv4 virtual multicast server address (192.0.2.3) corresponding to the multicast server address 3001::1 of the multicast server C3 of the domain bbb.com is generated, and registered in the IPv6 multicast address translation table 2015 (SQ2-9, FIG. 10: S3008, FIG. 3(e)). Furthermore, in the translator T1, the virtual addresses stored in the virtual address pool 2018 within the storage range are randomly released, and the IPv4 virtual multicast group address (238.0.1.2) corresponding to the multicast group address (f040::1) of the domain bbb.com is generated and registered in the IPv6 multicast address translation table 2015 (SQ2-10, FIG. 10: S3009, FIG. 3(e)).

The translator T1 transmits the virtual multicast group address 238.0.1.2 thus generated and the virtual multicast server address 192.0.2.3 as Response to DNS Proxy D3 (SQ2-11, FIG. 10: S3010).

In DNS Proxy D3, the IPv6 multicast server address 3001::1, the virtual IPv4 multicast group address 238.0.0.1 and the virtual multicast server addresses 192.0.1.1, 192.0.1.2 of the multicast server C3 of the domain bbb.com received from the translator T1 (FIG. 8: S1007) in the IPv6 multicast address managing table (6000) (FIG. 8: S1008, FIG. 4(d)).

Subsequently, the processing from SQ2-12 to SQ2-23 is executed as in the case of the sequence SQ1 shown in FIG. 7 described above.

3. Third Embodiment

A third embodiment relates to a case where no notification on the multicast server address is made to the translator T1 by the IPv6 DNS server D2 and the multicast server address managing server MA1. The system construction and the processing flow of each table (2015, 6000, 7000, 8000) and each server (T1, D1, D2, D3, MA1) are the same as the first and second embodiments shown in FIGS. 1 to 6, FIGS. 8 to 11 and FIG. 13.

Figure 14:
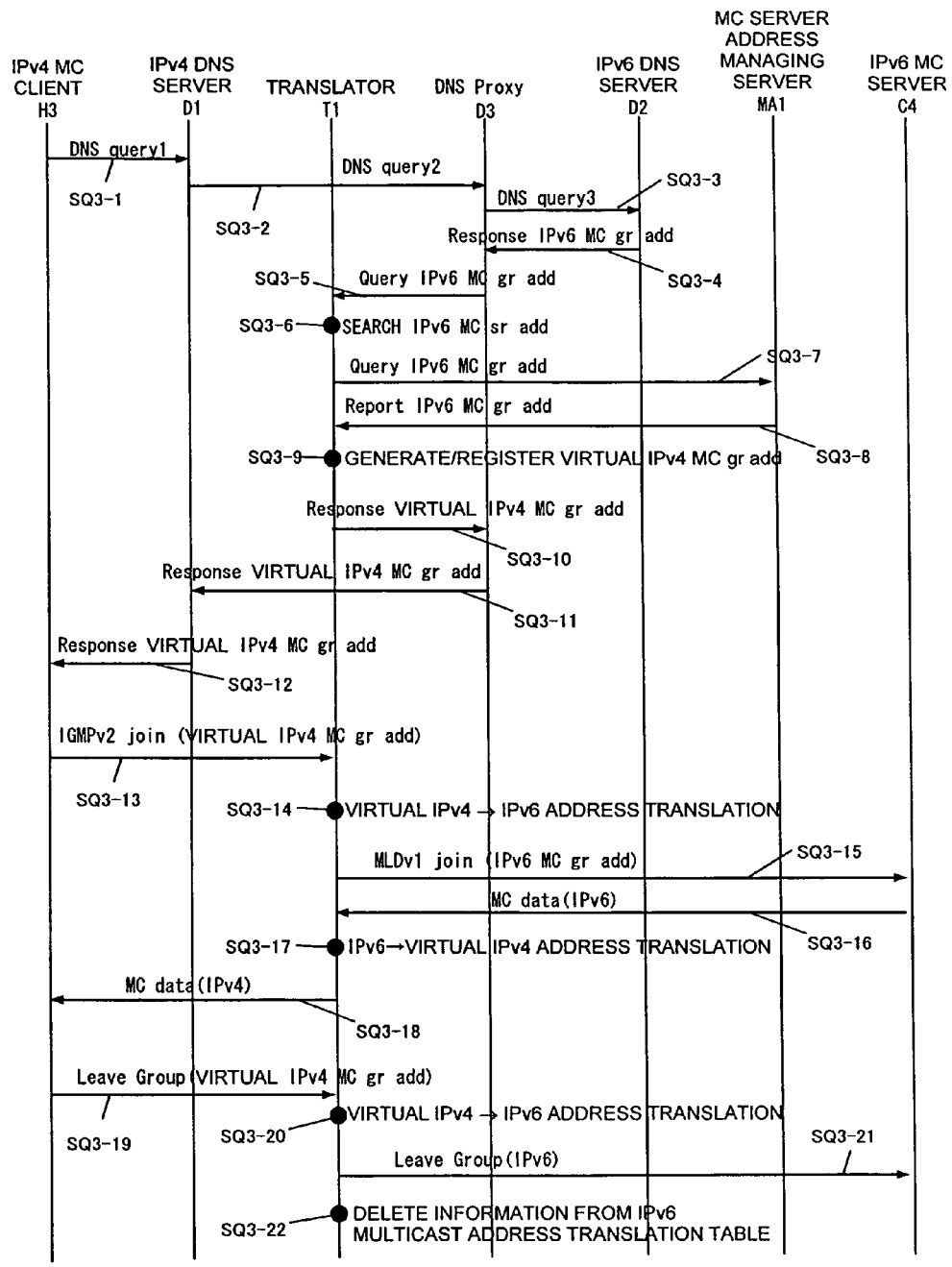
FIG. 14 is a diagram showing a sequence of the third embodiment.

FIG. 14 is a sequence diagram (SQ3) when the multicast server address managing server MA1 of the third embodiment makes no notification on the multicast server address.

The multicast client H3 of the IPv4 network NW1 transmits DNS query 1 as a multicast address notification request to the IPv4 DNS server D1 by using as a key the domain ccc.com of the multicast server C4 of the IPv6 network NW2 whose contents are wished to be viewed (SQ3-1).

Subsequently, the processing from SQ3-2 to SQ3-7 is executed as in the case of the sequence SQ2 shown in FIG. 12 in the above-described second embodiment.

In the multicast server address managing server MA1, the multicast server address managing table 8000 of FIG. 6 which is held in advance is searched by using as a key the multicast group address f036::2 of the multicast server C4 of the domain ccc.com received from the translator T1 (FIG. 13: S5001). At the search time, the multicast server address managing server MA1 judges whether the multicast server address corresponding to the multicast group address f036::2 of the multicast server C4 of the domain ccc.com is held in the table (FIG. 13: S5002). In the case of the multicast server C4 of the multicast group address f036::2, no multicast server address is held in the table, and thus the multicast address managing server MA1 transmits only the multicast group address f036::2 of the multicast server C4 as Report to the translator T1 (SQ3-8, FIG. 13: S5003).

The translator T1 judges whether the multicast server address is held in the information of Report IPv6 MC add received from the multicast server address managing server MA1 (FIG. 10: S3007). In the case of the multicast server C4 of the domain ccc.com, the multicast server address is not held in the information of Report IPv6 MC add. Therefore, the virtual addresses stored in the virtual address pool 2018 within the storage range are randomly released, and the virtual multicast group address (IPv4)(238.0.3.3) corresponding to the multicast group address f036::2 of the multicast server C4 of the domain ccc.com is generated and registered in the IPv6 multicast address translation table 2015 (SQ3-9, FIG. 10: S3009, FIG. 3: (g)).

The translator T1 transmits the virtual multicast group address 238.0.3.3 thus generated as Response to DNS Proxy D3 (SQ3-10, FIG. 10: S3010).

Subsequently, the processing from SQ3-11 to SQ3-18 is executed as in the case of the sequence SQ1 shown in FIG. 7. However, in join (SQ3-13), MLDv1 join (SQ3-15), IPv6-IPv4 multicast content distribution (SQ3-16, SQ3-15), and Leave Group (SQ3-19, SQ3-21), is provided the multicast server using IGMPv2, MLDv1 in which only the multicast group address f036::2 and the virtual multicast group address 238.0.3.3 are indicated and the multicast server address and the IPv4 virtual multicast server address are not indicated.

4. Fourth Embodiment

A fourth embodiment relates to the processing when the multicast server address is held in the IPv6 multicast address translation table 2015 in the translator T1. The system construction and the processing flow of each table (2015, 6000, 7000) and each server (T1, D1, D2, D3) are the same as shown in FIGS. 1 to 5, FIG. 8 to 11.

Figure 15:
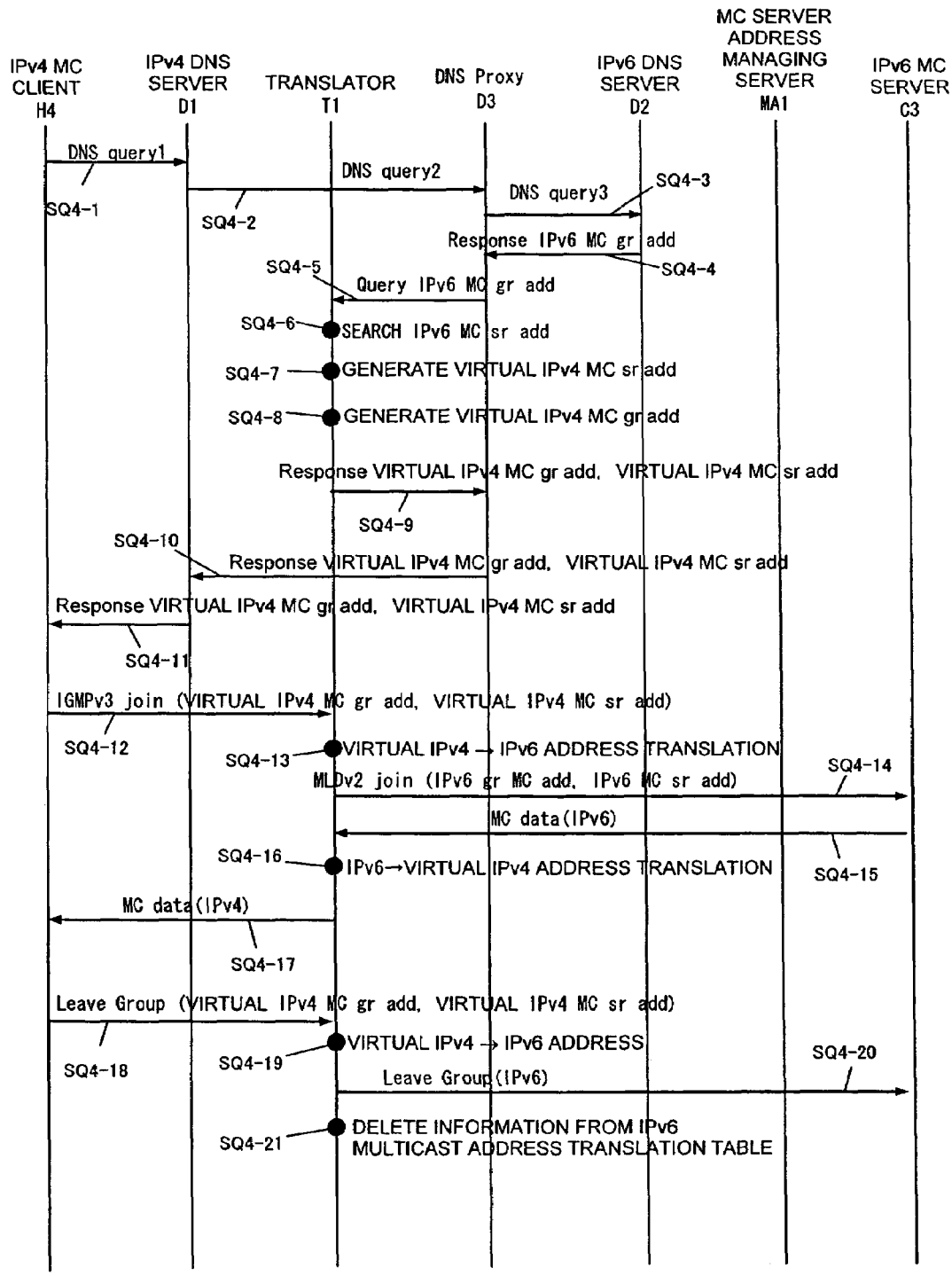
FIG. 15 is a diagram showing a sequence of the fourth embodiment.

FIG. 15 shows a sequence SQ4 when the multicast server address is held in the IPv6 multicast address translation table 2015 of the translator T1 of the fourth embodiment.

The multicast client H4 of the IPv4 network NW1 transmits to the IPv4 DNS server D1 DNS query 1 as a multicast address notification request by using as a key the domain bbb.com of the multicast server C3 of the IPv6 network NW2 whose contents are wished to be viewed (SQ4-1).

Subsequently, the processing from SQ4-2 to SQ4-5 is executed as in the case of the sequence SQ2 shown in FIG. 12 in the second embodiment.

After receiving DNS query 3 from DNS Proxy D3, the IPv6 DNS server D2 searches the multicast address managing table 7000 of FIG. 5 held in advance (FIG. 9: S2001). At the search time, the IPv6 DNS server D2 judges whether the multicast server address of the multicast server C3 of the domain bbb.com is held in the table (FIG. 9: S2002). The multicast server address of the multicast server C3 of the domain bbb.com is not registered and held in the IPv6 DNS server D2 by the maintenance worker, and thus only the multicast group address (f040::1) of the multicast server C3 of the domain bbb.com is transmitted as Response to DNS Proxy D3 (SQ4-4, FIG. 9: S2003).

DNS Proxy D3 registers the multicast group address f040::1 of the domain bbb.com received from the IPv6 DNS server D2 (FIG. 8: S1003) into the multicast address managing table 6000 (FIG. 4: (c), FIG. 8: S1004). By using as a key the multicast group address f040::1 received from the IPv6 DNS server D2 (FIG. 8: S1003), DNS Proxy D3 transmits to the translator T1 Query IPv6 MC add as a request for generating the IPv4 virtual multicast group address corresponding to the address (SQ4-5, FIG. 8: S1005).

The translator T1 judges whether the multicast server address is held in the information of Query IPv6 MC add received from DNS Proxy D3 (FIG. 10: S3001). The multicast server address of the multicast server C3 of the domain bbb.com is not registered in DNS Proxy D3 by the maintenance worker, and thus the IPv6 multicast address translation table 2015 held in advance is searched by using the multicast group address f040::1 as a key (SQ4-6, FIG. 10: S3002). At the search time, the translator T1 judges whether the multicast server address corresponding to the multicast group address f040::1 is held in the table (FIG. 10: S3003).

At this time, it is assumed that the table of the multicast group address f040::1 of the multicast server C3 of the domain bbb.com and the multicast server address 3001::1 is held in the IPv6 multicast address translation table 2015 at the time of the DNS request of the multicast client H2 as in the case of the second embodiment. As described above, when the table of the multicast group address and the multicast server address are held in the translator T1 on the assumption, it is unnecessary to transmit Query IPv6 MC gr add as an inquiry of the multicast server address from the translator T1 to the multicast server address managing server MA1.

In the translator T1, the multicast server address (3001::1) of the multicast server C3 of the domain bbb.com is extracted, the virtual addresses stored in the virtual address pool 2018 within the storage range are randomly released and the IPv4 virtual multicast server address (192.0.2.3) corresponding to the address is generated (SQ4-7, FIG. 10: S3008). Furthermore, in the translator T1, the virtual addresses stored in the virtual address pool 2018 within the storage range are randomly released, and the IPv4 virtual multicast group address (238.0.1.2) corresponding to the multicast group address of the domain bbb.com is generated (SQ4-8, FIG. 10: S3009).

In the translator T1, the virtual multicast group address 238.0.1.2 and the virtual multicast server address 192.0.2.3 thus generated are transmitted as Response to DNS Proxy D3 (SQ4-9, FIG. 10: S3010).

Subsequently, the processing from SQ4-10 to SQ4-21 is executed as in the case of the sequence SQ2 shown in FIG. 12 of the second embodiment.

5. Fifth Embodiment

In a fifth embodiment, the same processing as the first embodiment is executed by the construction that multicast clients H5 to H8 of the IPv6 NW2 receive contents of multicast servers C5 to C8 of the IPv4 network NW1.

5-1. System Construction

Figure 16:
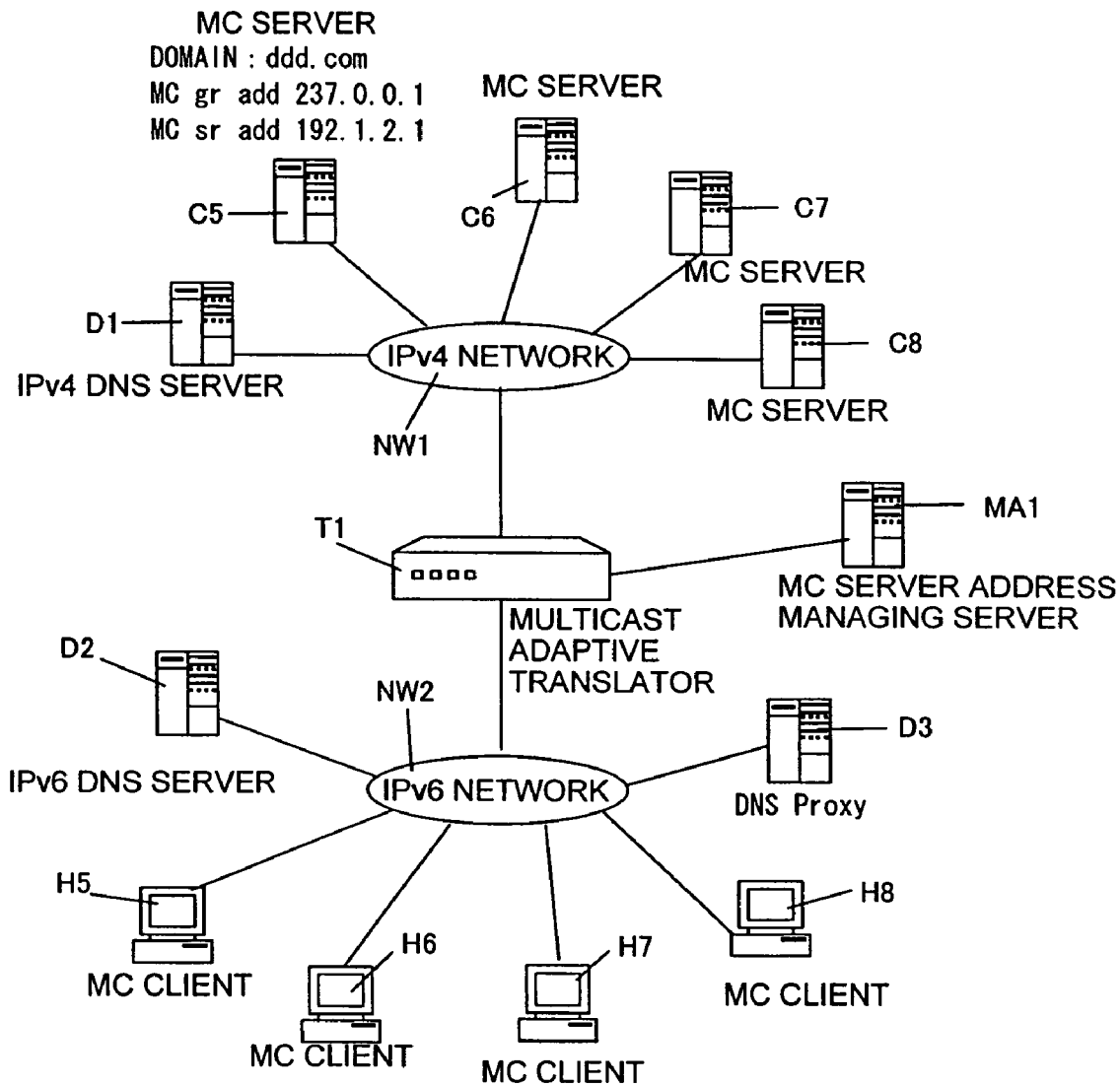
FIG. 16 is a diagram showing the construction of a communication system according to a fifth embodiment.

FIG. 16 is a diagram showing the construction of a network according to the fifth embodiment.

FIG. 17 is a diagram showing the construction of an IPv4 multicast address translation table 2014 in the translator T1.

The IPv4 multicast address translation table 2014 contains an IPv4 multicast group address 20141, an IPv4 multicast server address 20142, an IPv6 virtual multicast group address 20143 and an IPv6 virtual multicast server address 20144.

The multicast group address 20141 and the multicast server address 20142 are registered in the IPv4 multicast address translation table 2014 after the translator T1 receives the multicast group address and the multicast server address from DNS Proxy D3.

The virtual multicast group address 20143 and the virtual multicast server address 20144 are registered in the IPv4 multicast address translation table 2014 after the translator T1 generates the virtual multicast group address and the virtual multicast server address corresponding to the multicast group address and the multicast server address received from DNS Proxy D3.

Furthermore, after the translator T1 translates Leave Group as a multicast release message received from the multicast client (H5 to H8) of the IPv6 network NW2 to an IPv4 multicast address and transmits it to the multicast server (C5 to C8) of the IPv4 network NW1, the series of information is deleted from the IPv4 multicast address managing table 2014.

FIG. 18 is a diagram showing the construction of the IPv4 multicast address managing table 6100 in DNS Proxy D3.

The IPv4 multicast address managing table 6100 contains a domain 61001, an IPv4 multicast group address 61002, an IPv4 multicast server address 61003, an IPv6 virtual multicast group address 61004 and an IPv6 virtual multicast serer address 61005.

The domain 61001 is registered in the IPv4 multicast address managing table 6100 after DNS Proxy D3 receives the DNS request from the IPv6 DNS server D2. Furthermore, the multicast group address 61002 and the multicast server address 61003 are registered in the IPv4 multicast address managing table 6100 after DNS Proxy D3 receives the multicast group address and the multicast server address from the IPv4 DNS server D1. The virtual multicast group address 61004 and the virtual multicast server address 61005 are registered in the IPv4 multicast address managing table 6100 after DNS Proxy D3 receives the virtual multicast group address and the virtual multicast server address from the translator T1.

After DNS Proxy D3 notifies the virtual multicast group address and the virtual multicast server address to the IPv6 DNS server D2, the virtual multicast group address and the virtual multicast server address are deleted from the IPv4 multicast address managing table 6100.

FIG. 19 is a diagram showing the construction of the multicast address managing table 9000 in the IPv4 DNS server D1.

The multicast address managing table 9000 contains a domain 90001, an IPv4 multicast group address 90002 and an IPv6 multicast server address 90003. The information in the multicast address managing table 9000 is held in the IPv4 DNS server D1 in advance.

FIG. 20 is a diagram showing the construction of the IPv4 multicast address managing table 8100 in the multicast server address managing server MA1.

The IPv4 multicast address managing table 8100 contains the IPv4 multicast group address 81001 and the Ipv4 multicast server address 81002. The information in the Ipv4 multicast address managing table 8100 for managing the multicast group address and the multicast server address is renewed in accordance with the number of multicast servers being used which increases/decreases in accordance with the content distribution service content (program, time zone, etc.).

5-2. Processing

Figure 21:
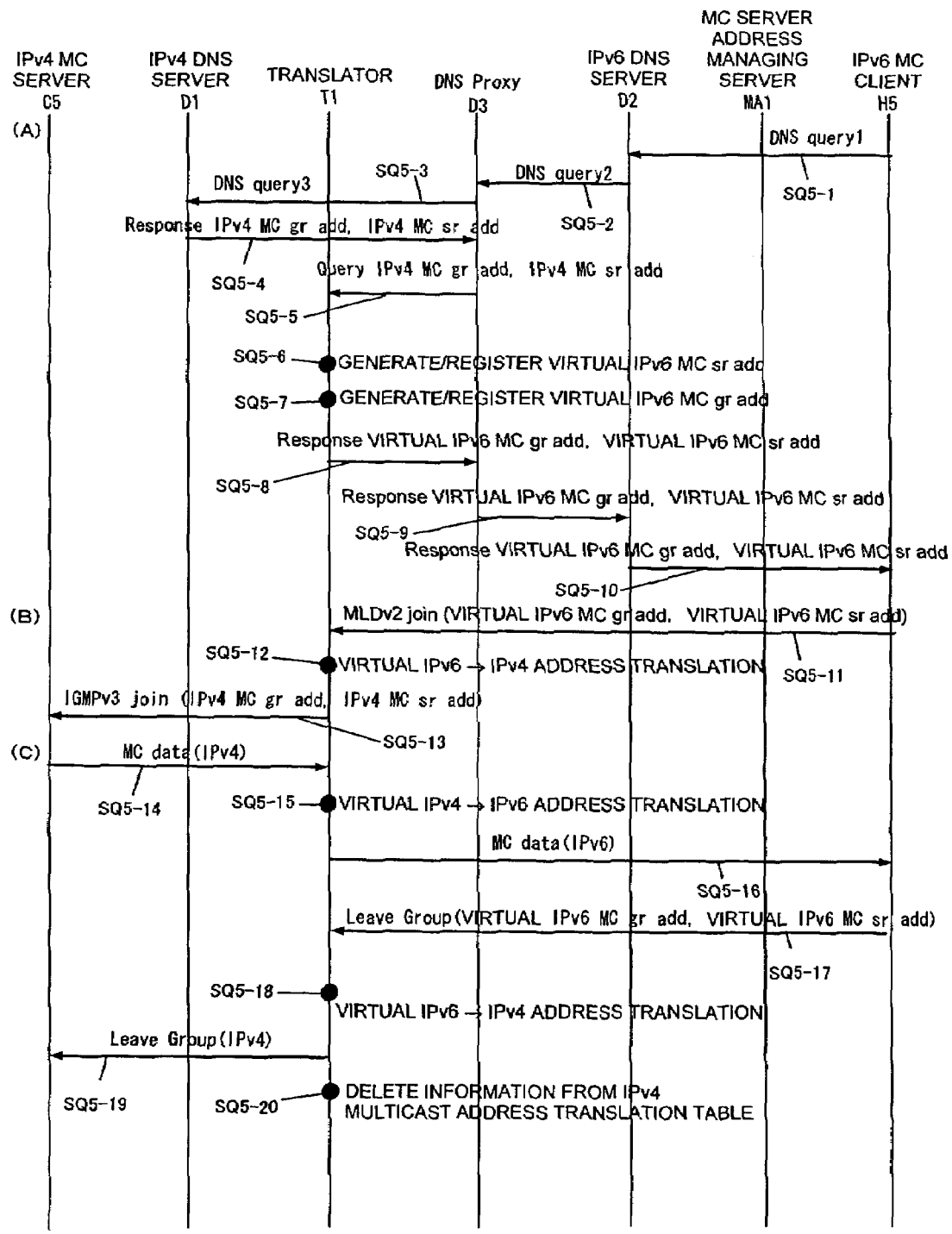
FIG. 21 is a diagram showing a sequence of the fifth embodiment of the present invention.

FIG. 21 is a sequence diagram showing the fifth embodiment.

A. MC Address Achievement

First, the multicast client H5 of the IPv6 network transmits to the IPv6 DNS server D2 DNS query 1 as a request for notifying the multicast address by using as a key the domain ddd.com of the multicast server C5 of the IPv4 network NW1 whose contents are wished to be viewed (SQ5-1).

The IPv6 DNS server D2 does not hold the information of the multicast server C5 existing in the IPv4 network NW1, and thus transmits DNS query 2 of the domain ddd.com to DNS Proxy D3 (SQ5-2).

DNS Proxy D3 transmits DN query 3 of the domain ddd.com while setting the virtual IPv6 unicast address of the IPv4 DNS server D1 existing in the IPv4 network NW1 as a destination address (SQ5-3). At this time, the translator T1 refers to the IPv4 unicast address translation table 2016 which is held in advance, translates the virtual IPv6 unicast address of the IPv4 DNS serer D1 to the IPv4 unicast address and transmits DNS query 3 from DNS Proxy D3 to the IPv4 DNS server D1.

The IPv4 DNS server D1 searches the multicast address managing table 9000 of FIG. 19 which is held in advance. A the search time, the IPv4 DNS server D1 judges whether the multicast serer address is held in the table of the multicast server C5 of the domain ddd.com. In the case of the multicast server C5 of the domain ddd.com, the multicast group address and the multicast serer address are registered and held by the maintenance worker, and thus the multicast group address (237.0.0.1) and the multicast server address (192.1.2.1) of the domain ddd.com are transmitted as Response to DNS Proxy D3.

DNS Proxy D3 registers the multicast group address (237.0.0.1) and the multicast server address (192.1.2.1) of the domain ddd.com received from the DNS server D1 into the IPv4 multicast address managing table 6100 (FIG. 18: (a)). By using as a key the multicast group address (237.0.0.1) and the multicast server address (192.1.2.1) received from the IPv4 DNS server D1, DNS Proxy D3 transmits to the translator T1 Query IPv4 MC add as a request for generating the IPv6 virtual multicast group address and the IPv6 virtual multicast server address corresponding to the address concerned (SQ5-5).

The translator T1 registers the multicast group address (237.0.0.1) and the multicast server address (192.1.2.1) of the multicast server C5 received from DNS Proxy D3 into the IPv4 multicast address translation table 2014 (FIG. 17: (a)). At this time, the translator T1 judges whether the multicast server address is held in the information of Query IPv4 MC add received from DNS Proxy D3. In the case of the multicast server C5 of the domain ddd.com, the multicast group address and the multicast server address are registered and held in DNS Proxy D3 by the maintenance worker or the like, and thus the multicast server address is held in the information of the received Query IPv4 MC add.

Accordingly, the translator T1 randomly releases the virtual address stored in the virtual address pool 2018 within the storage range, and generates the IPv6 virtual multicast server address (2050::5) corresponding to the multicast server address (192.1.2.1) of the multicast server C5 of the domain ddd.com. The addresses to be released are stored in the virtual address pool 2018, and the virtual addresses are released randomly. In the translator T1, the IPv6 virtual multicast server address (2050::5) corresponding to the multicast server address (192.1.2.1) of the multicast server C5 of the domain ddd.com is generated, and then the virtual multicast server address is registered in the IPv4 multicast address translation table 2014 (SQ5-6, FIG. 17(b)). Furthermore, the translator T1 randomly releases the virtual addresses stored in the virtual address pool 2018 within the storage range, generates the IPv6 virtual multicast group address (f020::1) corresponding to the multicast group address (237.0.0.1) of the multicast server C5 of the domain ddd.com and registers it into the IPv4 multicast address translation table 2014 (SQ5-7, FIG. 17(b)).

The translator T1 transmits the virtual multicast group address f0200::1 and the virtual multicast server address 2050::5 thus generated as Response to DNS Proxy D3 (SQ5-8).

DN Proxy D3 registers the virtual multicast group address f020::1 and the virtual multicast server address 2050::5 received from the translator T1 into the IPv4 multicast address managing table 6100 (FIG. 18(b)). After DNS Proxy D3 registers those into the IPv4 multicast address managing table 6100, DNS Proxy D3 transmits the virtual multicast group address f020::1 of the multicast server C5 of the domain ddd.com and the virtual multicast server address 2050::5 as Response to the IPv6 DNS server D2 (SQ5-9). After DNS Proxy D3 transmits the virtual multicast group address f020::1 of the multicast server C5 and the virtual multicast server address 2050::5 of the domain ddd.com to the IPv6 DNS server D2, it deletes from the table the virtual multicast group address and the virtual multicast server address of the multicast server C5 of the domain ddd.com held in the IPv4 multicast address managing table 6100.

The IPv6 DNS server D2 judges whether the virtual multicast server address is held in the information of Response virtual IPv6 MC add received from DNS Proxy D3. In the case of the multicast server C5 of the domain ddd.com, the IPv6 virtual multicast group address and the IPv6 virtual multicast serer address are held in the information of Response virtual IPv6 MC add, and thus the IPv6 DNS server D2 transmits the virtual multicast group address f020::1 and the virtual multicast server address 2050 of the multicast server C5 of the domain ddd.com as Response to the multicast client H5 of the IPv6 network NW1 (SQ5-10).

B. Join Transmission

The multicast client H5 transmits join of MLDv2 while addressing to the IPv6 virtual multicast group address f020::1 and the IPv6 virtual multicast server address 2050::5 of the multicast server C5 (SQ5-11).

The translator T1 receives join of MLDv2 of the multicast client H5, and it refers to the IPv4 multicast address translation table 2014 in the controller 20, translates the virtual multicast group address f020::1 of MLDv2 to the multicast group address 237.0.0.1 of IGMPv3 and also translate the virtual multicast server address 2050::5 of MLDv2 to the multicast server address 192.1.2.1 of IGMPv (SQ5-12), and then transmits join of IGMPv3 to the multicast server C5 of the IPv4 network NW1 (SQ5-13).

C. Content Distribution

When the multicast server C5 of the IPv4 network NW1 distributes a content to the multicast client H5 of the IPv6 network NW2, the controller 20 of the translator T1 refers to the IPv4 multicast address translation table 2014 to translate the IPv4 multicast group address 237.0.0.1 to the IPv6 virtual multicast group address f020::1 and also translate the IPv4 multicast server address 192.1.2.1 to the IPv6 virtual multicast server address 2050::5, and then transmit the content distribution data of the IPv4 network NW1 to the multicast client H5 of the IPv6 network NW2 (SQ5-16).

Furthermore, when the translator T1 receives Leave Group as a multicast release message from the multicast client H5 of the IPv6 network NW2 (SQ5-17), the controller 20 of the translator T1 refers to the IPv4 multicast address translation table 2014 to translate the IPv6 virtual multicast group address f020::1 to the IPv4 multicast group address 237.0.0.1 and also translate the IPv6 virtual multicast server address 2050::5 to the IPv4 multicast server address 192.1.2.1 (SQ5-18), and then transmits Leave Group to the multicast server C5 of the IPv4 network NW1 (SQ5-19).

In the translator T1, after Leave Group is transmitted to the multicast server C5 of the IPv4 network NW1, the information of the multicast server C5 is deleted from the IPv4 multicast address managing table 2014 (SQ5-20).

In the second, third and fourth embodiments, the virtual IPv6 multicast group address and the virtual IPv6 multicast server address can be likewise generated on the basis of the DNS request of the multicast client (H5 to H8) of the IPv6 network as a trigger.

However, in the translator T1, the IPv4 multicast address translation table 2014 of FIG. 17 is created and used in place of the IPv6 multicast address translation table 2015 of FIG. 3. In DNS Proxy D3, the IPv4 multicast address managing table 6100 is created and used in place of the IPv6 multicast address managing table 6000 of FIG. 4. Furthermore, in the multicast server address managing server MA1, the IPv4 multicast address managing table 8100 of FIG. 20 is created and used in place of the IPv6 multicast address managing table 8000. Furthermore, the multicast address managing table 9000 in the IPv4 DNS server D1 of FIG. 19 is created and used in place of the multicast address managing table 7000 in the IPv6 DNS server D2 of FIG. 5.

The present invention may be applied to various kinds of communication systems for multicast distribution.

What is claimed is:

1. A communication system comprising:
an IPv4 network for transferring packets according to an IPv4 multicast (MC) address;
an IPv6 network for transferring packets according to an IPv6 MC address;
an MC adaptive translator T1 having an IPv6 MC address translation table in which MC group address and MC server address of IPv6 and virtual MC group address and virtual MC server address of IPv4 are stored in association with one another, the translator T1 mutually connecting the IPv4 network and the IPv6 network and carrying out IPv4-IPv6 MC packet conversion;
an IPv4 DNS server D1 that is connected to the IPv4 network and responds to a Domain Name System (DNS) request from an IPv4 MC client;
a DNS proxy D3 that is connected to the IPv6 network and has an IPv6 MC address managing table for storing a domain, an MC group address, an MC server address, a virtual MC group address and a virtual MC server address in association with one another; and
an IPv6 network DNS server D2 that is connected to the IPv6 network and has an MC address managing table for storing a domain, an MC group address and an MC server address in association with one another,
wherein the MC client of the IPv4 network transmits a DNS request 1 as an MC address notifying request to the IPv4 DNS server D1 by using as a key a domain of an MC server of the IPv6 network whose content is viewed/listened to;
the IPv4 DNS server D1 transmits a DNS request 2 of the domain concerned while a virtual IPv4 unicast address of a DNS proxy D3 existing in the IPv6 network is set as a destination address;
the DNS proxy D3 transmits a DNS request 3 of the domain concerned to the IPv6 DNS server D2;
the IPv6 DNS server D2 searches the MC address managing table and returns the MC group address and the MC server address of the MC server of the domain to the DNS proxy D3;
the DNS proxy D3 registers the received MC group address and MC server address into the IPv6 MC address managing table, and transmits a request for generating the virtual MC group address and virtual MC server address corresponding to both the addresses concerned to the translator T1;

the translator T1 generates the virtual MC group address and the virtual MC server address of IPv4 corresponding to the received MC group address and MC server address respectively, registers the virtual MC group address and the virtual MC server address into the IPv6 MC address translation table and transmits the virtual MC group address and the virtual MC server address to the DNS proxy D3;

the DNS proxy D3 registers the received virtual MC group address and virtual MC server address into the IPv6 MC address managing table and transmits the virtual MC group address and the virtual MC server address to the IPv4 DNS server D1; and the IPv4 DNS server D1 transmits the virtual MC group address and virtual MC server address of the MC server of the domain to the MC client of the IPv4 network NW1.

2. A communication system comprising:

an IPv4 network for transferring packets according to an IPv4 multicast (MC) address;

an IPv6 network for transferring packets according to an IPv6 MC address;

an MC adaptive translator T1 having an IPv6 MC address translation table in which MC group address and MC server address of IPv6 and virtual MC group address and virtual MC server address of IPv4 are stored in association with one another, the translator T1 mutually connecting the IPv4 network and the IPv6 network and carrying out IPv4-IPv6 MC packet conversion;

an IPv4 DNS server D1 that is connected to the IPv4 network and responds to a Domain Name System (DNS) request from an IPv4 MC client;

a DNS proxy D3 that is connected to the IPv6 network and has an IPv6 MC address managing table for storing a domain, an MC group address, an MC server address, a virtual MC group address and a virtual MC server address in association with one another;

an IPv6 network DNS server D2 that is connected to the IPv6 network and has an MC address managing table for storing a domain, an MC group address and an MC server address in association with one another; and an MC server address managing server MA1 having an IPv6 MC address managing table for managing the MC group address and the MC server address, wherein the MC client of the IPv4 network transmits a DNS request 1 as an MC address notifying request to the IPv4 DNS server D1 by using as a key a domain of an MC server of the IPv6 network whose content is viewed/listened to;

the IPv4 DNS server D1 transmits a DNS request 2 of the domain concerned while a virtual IPv4 unicast address of a DNS proxy D3 existing in the IPv6 network is set as a destination address;

the DNS proxy D3 transmits a DNS request 3 of the domain concerned to the IPv6 DNS server D2;

the IPv6 DNS server D2 searches the MC address managing table, and returns only the MC group address of the MC server of the domain when the MC server address of the MC server of the domain is not held;

the DNS proxy D3 registers the received MC group address into the IPv6 MC address managing table and transmits a request for generating the virtual MC group address corresponding to the MC group address to the translator T1;

the translator T1 registers the received MC group address into the IPv6 MC address translation table, searches the IPv6 MC address translation table and transmits a request for notifying the MC server address to the MC server address managing server MA1 by using the MC group address as a key when the MC server address corresponding to the MC group address is not held;

the MC server address managing server MA1 searches the MC server address corresponding to the MC group address and transmits the MC server address to the translator T1;

the translator T1 generates the IPv4 virtual MC server address corresponding to the received MC server address and the IPv4 virtual MC group address corresponding to the MC group address, registers the IPv4 virtual MC server address and the IPv4 virtual MC group address into the IPv6 MC address translation table and then returns the IPv4 virtual MC server address and the virtual MC group address to the DNS proxy D3;

The DNS proxy D3 registers the received virtual MC group address and virtual MC server address into the IPv6 MC address managing table, and transmits the virtual MC group address and the virtual MC server address to the IPv4 DNS server D1; and the IPv4 DNS server D1 transmits the virtual MC group address and the virtual MC server address of the MC server of the domain to the MC client of the IPv4 network NW1.

3. A communication system comprising:

an IPv4 network for transferring packets according to an IPv4 multicast (MC) address;

an IPv6 network for transferring packets according to an IPv6 MC address;

an MC adaptive translator T1 having an IPv6 MC address translation table in which MC group address and MC server address of IPv6 and virtual MC group address and virtual MC server address of IPv4 are stored in association with one another, the translator Ti mutually connecting the IPv4 network and the IPv6 network and carrying out IPv4-IPv6 MC packet conversion;

an IPv4 DNS server D1 that is connected to the IPv4 network and responds to a Domain Name System (DNS) request from an IPv4 MC client;

a DNS proxy D3 that is connected to the IPv6 network and has an IPv6 MC address managing table for storing a domain, an MC group address, an MC server address, a virtual MC group address and a virtual MC server address in association with one another;

an IPv6 network DNS server D2 that is connected to the IPv6 network and has an MC address managing table for storing a domain, an MC group address and an MC server address in association with one another; and an MC server address managing server MA1 having an IPv6 MC address managing table for managing the MC group address and the MC server address, wherein the MC client of the IPv4 network transmits a DNS request 1 as an MC address notifying request to the IPv4 DNS server D1 by using as a key a domain of an MC server of the IPv6 network whose content is viewed/listened to;

the IPv4 DNS server D1 transmits a DNS request 2 of the domain concerned while a virtual IPv4 unicast address of a DNS proxy D3 existing in the IPv6 network is set as a destination address;

the DNS proxy D3 transmits a DNS request 3 of the domain concerned to the IPv6 DNS server D2;

the IPv6 DNS server D2 searches the MC address managing table, and returns only the MC group address of the MC server of the domain when the MC server address of the MC server of the domain is not held;

the DNS proxy D3 registers the received MC group address into the IPv6 MC address managing table and transmits a request for generating the virtual MC group address corresponding to the MC group address to the translator T1;

the translator T1 generates the virtual MC group address and virtual MC server address corresponding to the MC group address and MC server address respectively, registers the virtual MC group address and the virtual MC server address into the IPv6 MC address translation table and returns the virtual MC group address and the virtual MC server address to the DNS proxy D3, when a table of the MC group address and the MC server address of the MC server of the domain has been already held in the IPv6 MC address translation table at the previous DNS request time of the MC client;

the DNS proxy D3 registers the received virtual MC group address and virtual MC server address into the IPv6 MC address managing table and transmits the virtual MC group address and the virtual MC server address to the IPv4 DNS server D1; and the IPv4 DNS server D1 transmits the virtual MC group address and the virtual MC server address of the MC server of the domain to the MC client of the IPv4 network NW1.

4. A communication system comprising:

an IPv4 network for transferring packets according to an IPv4 multicast (MC) address;

an IPv6 network for transferring packets according to an IPv6 MC address;

an MC adaptive translator T1 having an IPv6 MC address translation table in which MC group address and MC server address of IPv6 and virtual MC group address and virtual MC server address of IPv4 are stored in association with one another, the translator T1 mutually connecting the IPv4 network and the IPv6 network and carrying out IPv4-IPv6 MC packet conversion;

an IPv4 DNS server D1 that is connected to the IPv4 network and responds to a Domain Name System (DNS) request from an IPv4 MC client;

a DNS proxy D3 that is connected to the IPv6 network and has an IPv6 MC address managing table for storing a domain, an MC group address, an MC server address, a virtual MC group address and a virtual MC server address in association with one another;

an IPv6 network DNS server D2 that is connected to the IPv6 network and has an MC address managing table for storing a domain, an MC group address and an MC server address in association with one another; and an MC server address managing server MA1 having an IPv6 MC address managing table for managing the MC group address and the MC server address, wherein the MC client of the IPv4 network transmits a DNS request 1 as an MC address notifying request to the IPv4 DNS server D1 by using as a key a domain of an MC server of the IPv6 network whose content is viewed/listened to;

the IPv4 DNS server D1 transmits a DNS request 2 of the domain concerned while a virtual IPv4 unicast address of a DNS proxy D3 existing in the IPv6 network is set as a destination address;

the DNS proxy D3 transmits a DNS request 3 of the domain concerned to the IPv6 DNS server D2;

the IPv6 DNS server D2 searches the MC address managing table, and returns only the MC group address of the MC server of the domain when the MC server address of the MC server of the domain is not held;

the DNS proxy D3 registers the received MC group address into the IPv6 MC address managing table and transmits a request for generating the virtual MC group address corresponding to the MC group address to the translator T1;

the translator T1 registers the received MC group address into the IPv6 MC address translation table, and searches the IPv6 MC address translation table, and transmits a request for notifying the MC server address to the MC server address managing server MA1 by using the MC group address as a key when the MC server address corresponding to the MC group address is not held;

the MC server address managing server MA1 transmits only the MC group address to the translator T1 when the MC server address corresponding to the MC group address is not held in the IPv6 MC address managing table;

the translator T1 generates the virtual MC group address corresponding to the MC group address, registers the virtual MC group address into the IPv6 MC address translation table and transmits the virtual MC group address to the DNS proxy D3;

the DNS proxy D3 registers the received virtual MC group address into the IPv6 MC address managing table and transmits the virtual MC group address to the IPv4 DNS server D1; and the IPv4 DNS server D1 transmits the virtual MC group address of the MC server of the domain concerned to the MC client of the IPv4 network NW1.

5. A communication system comprising:

an IPv4 network for transferring packets according to an IPv4 multicast (MC) address;

an IPv6 for transferring packets according to an IPv6 MC address;

an MC adaptive translator T1 that has an IPv4 MC address translation table for storing MC group address and MC server address of IPv4 and virtual MC group address and virtual MC server address of IPv6 in association with one another, mutually connects the IPv4 network and the IPv6 network to each other and carries out IPv4-IPv6 MC packet conversion;

an IPv4 domain Name System (DNS) server D1 having an MC address managing table for storing a domain, an MC group address and an MC server address in association with one another;

an IPv6 DNS server D2 for responding to a DNS request from an IPv6 MC client; and a DNS proxy D3 of the IPv6 network having an IPv4 MC address managing table for storing a domain, an MC group address, an MC server address, a virtual MC group address and a virtual MC server address in association with one another, wherein the MC client of the IPv6 network transmits a DNS request 1 as an MC address notifying request to the IPv6 DNS server D2 by using as a key a domain of an MC server of the IPv4 network whose contents are wished to be viewed/listened;

the IPv6 DNS server D2 transmits a DNS request 2 of the domain concerned to the DNS proxy D3;

the DNS proxy D3 transmits a DNS request 3 of the domain concerned while a virtual IPv6 unicast address of the IPv4 DNS server D1 existing in the IPv4 network is set as a destination address;

the IPv4 DNS server D1 searches the MC address managing table to return the MC group address and the MC server address of the MC server of the domain concerned to the DNS proxy D3;

the DNS proxy D3 registers the received MC group address and MC server address into the IPv4 MC address managing table and transmits a request for generating the IPv6 virtual MC group address and IPv6 virtual MC server address corresponding to both the addresses concerned to the translator T1;

the translator T1 generates the IPv6 virtual MC group address and the IPv6 virtual MC server address corresponding to the received MC group address and MC server address, registers the IPv6 virtual MC group address into the IPv4 MC address translation table and then returns the IPv6 virtual MC group address to the DNS proxy D3;

the DNS proxy D3 registers the received virtual MC group address and virtual MC server address into the IPv4 MC address managing table and transmits the virtual MC group address and the virtual MC server address to the IPv6 DNS server D2; and the IPv6 DNS server D2 transmits the virtual MC group address and the virtual MC server address of the MC server of the domain to the MC client of the IPv6 network.

6. A communication system comprising:

an IPv4 network for transferring packets according to an IPv4 multicast (MC) address;

an IPv6 for transferring packets according to an IPv6 MC address;

an MC adaptive translator T1 that has an IPv4 MC address translation table for storing MC group address and MC server address of IPv4 and virtual MC group address and virtual MC server address of IPv6 in association with one another, mutually connects the IPv4 network and the IPv6 network to each other and carries out IPv4-IPv6 MC packet conversion;

an IPv4 domain Name System (DNS) server D1 having an MC address managing table for storing a domain, an MC group address and an MC server address in association with one another;

an IPv6 DNS server D2 for responding to a DNS request from an IPv6 MC client;

a DNS proxy D3 of the IPv6 network having an IPv4 MC address managing table for storing a domain, an MC group address, an MC server address, a virtual MC group address and a virtual MC server address in association with one another; and an MC server address managing server MA1 having an IPv4 MC address managing table for managing the MC group address and the MC server address, wherein the MC client of the IPv6 network transmits a DNS request 1 as an MC address notifying request to the IPv6 DNS server D2 by using as a key a domain of an MC server of the IPv4 network whose contents are wished to be viewed/listened;

the IPv6 DNS server D2 transmits a DNS request 2 of the domain concerned to the DNS proxy D3;

the DNS proxy D3 transmits a DNS request 3 of the domain concerned while a virtual IPv6 unicast address of the IPv4 DNS server D1 existing in the IPv4 network is set as a destination address;

the IPv4 DNS server D1 searches the MC address managing table, and transmits only the MC group address of the MC server of the domain concerned when the MC server address of the MC server of the domain concerned is not held in the table;

the DNS proxy D3 registers the received MC group address into the IPv4 MC address managing table and transmits a request for generating the virtual MC group address corresponding to the MC group address to the translator T1;

the translator T1 registers the received MC group address into the IPv4 MC address translation table, searches the IPv4 MC address translation table, and transmits a request for notifying the MC server address to the MC server address managing server MA1 by using the MC group address as a key, when the MC server address corresponding to the MC group address is not held;

the MC server address managing server MA1 searches the MC server address corresponding to the MC group address, and transmits the MC server address to the translator T1;

the translator Ti generates the IPv6 virtual MC server address corresponding to the received MC server address and the IPv6 virtual MC group address corresponding to the MC group address, registers the IPv6 virtual MC server address and the IPv6 virtual MC group address into the IPv4 MC address MC address translation table and transmits the IPv6 virtual MC server address and the IPv6 virtual MC group address to the DNS proxy D3;

the DNS proxy D3 registers the received virtual MC group address and virtual MC server address into the IPv4 MC address managing table and transmits the virtual MC group address and the virtual MC server address to the IPv6 DNS server D2; and the IPv6 DNS server D2 transmits the virtual MC group address and the virtual MC server address of the MC server of the domain to the MC client of the IPv6 network.

7. A communication system comprising:

an IPv4 network for transferring packets according to an IPv4 multicast (MC) address;

an IPv6 for transferring packets according to an IPv6 MC address;

an MC adaptive translator T1 that has an IPv4 MC address translation table for storing MC group address and MC server address of IPv4 and virtual MC group address and virtual MC server address of IPv6 in association with one another, mutually connects the IPv4 network and the IPv6 network to each other and carries out IPv4-IPv6 MC packet conversion;

an IPv4 domain Name System (DNS) server D1 having an MC address managing table for storing a domain, an MC group address and an MC server address in association with one another;

an IPv6 DNS server D2 for responding to a DNS request from an IPv6 MC client;

a DNS proxy D3 of the IPv6 network having an IPv4 MC address managing table for storing a domain, an MC group address, an MC server address, a virtual MC group address and a virtual MC server address in association with one another; and an MC server address managing server MA1 having an IPv4 MC address managing table for managing the MC group address and the MC server address, wherein the MC client of the IPv6 network transmits a DNS request 1 as an MC address notifying request to the IPv6 DNS server D2 by using as a key a domain of an MC server of the IPv4 network whose contents are wished to be viewed/listened;

the IPv6 DNS server D2 transmits a DNS request 2 of the domain concerned to the DNS proxy D3;

the DNS proxy D3 transmits a DNS request 3 of the domain concerned while a virtual IPv6 unicast address of the IPv4 DNS server D1 existing in the IPv4 network is set as a destination address;

the IPv4 DNS server D1 searches the MC address managing table, and transmits only the MC group address of the MC server of the domain concerned when the MC server address of the MC server of the domain concerned is not held in the table;

the DNS proxy D3 registers the received MC group address into the IPv4 MC address managing table and transmits a request for generating the virtual MC group address corresponding to the MC group address to the translator T1;

the translator T1 generates the virtual MC group address and the virtual MC server address corresponding to an MC group address and an MC server address, registers the virtual MC group address and the virtual MC server address in the IPv4 MC address translation table and returns the virtual MC group address and the virtual MC server address to the DNS proxy D3, when a table for the MC group address and the MC server address of the domain concerned has been already held in the IPv4 MC address translation table at the previous DNS request of the MC client;

the DNS proxy D3 registers the received virtual MC group address and virtual MC server address into the IPv4 MC address managing table and transmitting the virtual MC group address and the virtual MC server address to the IPv6 DNS server D2; and the IPv6 DNS server D2 transmits the virtual MC group address and the virtual MC server address of the MC server of the domain to the MC client of the IPv6 network.

8. A communication system comprising:

an IPv4 network for transferring packets according to an IPv4 multicast (MC) address;

an IPv6 for transferring packets according to an IPv6 MC address;

an MC adaptive translator T1 that has an IPv4 MC address translation table for storing MC group address and MC server address of IPv4 and virtual MC group address and virtual MC server address of IPv6 in association with one another, mutually connects the IPv4 network and the IPv6 network to each other and carries out IPv4-IPv6 MC packet conversion;

an IPv4 domain Name System (DNS) server D1 having an MC address managing table for storing a domain, an MC group address and an MC server address in association with one another;

an IPv6 DNS server D2 for responding to a DNS request from an IPv6 MC client;

a DNS proxy D3 of the IPv6 network having an IPv4 MC address managing table for storing a domain, an MC group address, an MC server address, a virtual MC group address and a virtual MC server address in association with one another; and an MC server address managing server MA1 having an IPv4 MC address managing table for managing the MC group address and the MC server address, wherein the MC client of the IPv6 network transmits a DNS request 1 as an MC address notifying request to the IPv6 DNS server D2 by using as a key a domain of an MC server of the IPv4 network whose contents are wished to be viewed/listened;

the IPv6 DNS server D2 transmits a DNS request 2 of the domain concerned to the DNS proxy D3;

the DNS proxy D3 transmits a DNS request 3 of the domain concerned while a virtual IPv6 unicast address of the IPv4 DNS server D1 existing in the IPv4 network is set as a destination address;

the IPv4 DNS server D1 searches the MC address managing table, and transmits only the MC group address of the MC server of the domain concerned when the MC server address of the MC server of the domain concerned is not held in the table;

the DNS proxy D3 registers the received MC group address into the IPv4 MC address managing table and transmits a request for generating the virtual MC group address corresponding to the MC group address to the translator T1;

the translator T1 registers the received MC group address into the IPv4 MC address translation table, searches the IPv4 MC address translation table and transmits a request for notifying the MC server address to the MC server address managing server MA1 by using the MC group address as a key, when the MC server address corresponding to the MC group address is not held;

the MC server address managing server MA1 transmits only the MC group address to the translator T1 when the MC server address corresponding to the MC group address is not held in the IPv4 MC managing table;

the translator T1 generates the virtual MC group address corresponding to the MC group address, registers the virtual MC group address in the IPv4 MC address translation table and transmits the virtual MC group address to the DNS proxy D3;

the DNS proxy D3 registers the received virtual MC group address into the IPv4 MC address managing table and transmits the virtual MC group address to the IPv6 DNS server D2; and the IPv6 DNS server D2 transmits the virtual MC group address of the MC server of the domain to the MC client of the IPv6 network.

9. The communication system according to claim 1, wherein the IPv4 MC client transmits IGMPv2 Join to the MC adaptive translator T1, and the MC adaptive translator T1 carries out translation of the IPv6 MC group address in MLDv1 from the virtual IPv4 MC group address in IGMPv2 and transmits Join of MLDv1 to the IPv6 MC server.

10. The communication system according to claim 1, wherein, when the IPv6 MC server transmits MC packets to the IPv4 MC client, the MC adaptive translator T1 carries out translation of the virtual IPv4 MC group address from the IPv6 MC group address and transmits MC packets to the IPv4 Mc client.

11. The communication system according to claim 1, wherein the IPv4 MC client transmits IGMPv3 Join to the MC adaptive translator T1, and the MC adaptive translator T1 carries out translation of the IPv6 MC group address and the IPv6 MC server address in MLDv2 from the virtual IPv4 MC group address and the virtual IPv4 MC server address in IGMPv3 , and transmits Join of MLDv2 to the IPv6 MC server.

12. The communication system according to claim 1, wherein, when the IPv6 MC server transmits MC packets to the IPv4 MC client, the MC adaptive translator T1 carries out translation of the virtual IPv4 MC group address and the MC server address from IPv6 to IPv4, and transmits the MC packets to the IPv4 MC client.

13. The communication system according to claim 5, wherein the IPv6 MC client transmits MLDv1 Join to the MC adaptive translator, and the MC adaptive translator T1 carries out translation of the IPv4 MC group address in the IGMPv2 from the virtual IPv6 MC group address in MLDv1 and transmits Join of IGMPv2 to the IPv4 MC server.

14. The communication system according to claim 5, wherein, when the IPv4 MC serer transmits MC packets to the IPv6 MC client, the MC adaptive translator T1 carries out translation of the virtual IPv6 MC group address from the IPv4 M]C group address, and transmits the MC packets to the IPv6 MC client.

15. The communication system according to claim 5, wherein the IPv6 MC client transmits MLDv2 Join to the MC adaptive translator, and the MC adaptive translator T1 carries out translation of the IPv4 MC group address and the IPv4 MC server address in IGMPv3 from the virtual IPv6 MC group address and the virtual IPv6 MC server address in MLDv2 and transmits Join of IGMPv3 to the IPv4 MC server.

16. The communication system according to claim 5, wherein, when the IPv4 MC server transmits MC packets to the IPv6 MC client, the MC adaptive translator T1 carries out translation of the MC group address and the MC server address from IPv4 to the virtual IPv6, and transmits the MC packets to the IPv6 MC client.

\* \* \* \* \*